United States Patent
Okada

(10) Patent No.: US 10,518,324 B2
(45) Date of Patent: Dec. 31, 2019

(54) SILVER-COATED COPPER POWDER, COPPER PASTE USING SAME, CONDUCTIVE COATING MATERIAL, CONDUCTIVE SHEET, AND METHOD FOR PRODUCING SILVER-COATED COPPER POWDER

(71) Applicant: SUMITOMO METAL MINING CO., LTD., Tokyo (JP)

(72) Inventor: Hiroshi Okada, Niihama (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 152 days.

(21) Appl. No.: 15/572,907

(22) PCT Filed: Oct. 27, 2015

(86) PCT No.: PCT/JP2015/080258
§ 371 (c)(1),
(2) Date: Nov. 9, 2017

(87) PCT Pub. No.: WO2016/185628
PCT Pub. Date: Nov. 24, 2016

(65) Prior Publication Data
US 2018/0154436 A1 Jun. 7, 2018

(30) Foreign Application Priority Data

May 15, 2015 (JP) ................................ 2015-099807

(51) Int. Cl.
*H01B 1/22* (2006.01)
*B22F 1/00* (2006.01)
(Continued)

(52) U.S. Cl.
CPC ............ *B22F 1/025* (2013.01); *B22F 1/0007* (2013.01); *B22F 1/0055* (2013.01);
(Continued)

(58) Field of Classification Search
CPC .... H01B 1/00; H01B 1/02; H01B 1/22; B22F 1/00; B22F 1/0007; B22F 1/0037;
(Continued)

(56) References Cited

U.S. PATENT DOCUMENTS

| 4,469,564 A | 9/1984 | Okinaka et al. |
| 4,652,465 A | 3/1987 | Koto et al. |

(Continued)

FOREIGN PATENT DOCUMENTS

| CN | 1363000 A | 8/2002 |
| CN | 1882550 A | 12/2006 |

(Continued)

OTHER PUBLICATIONS

Office Action dated Mar. 19, 2019, issued in the KR Patent Application No. 10-2017-7032925, (No English language translation provided).

(Continued)

*Primary Examiner* — Mark Kopec
(74) *Attorney, Agent, or Firm* — Locke Lord LLP

(57) ABSTRACT

Provided is a silver-coated copper powder which can be utilized as an electrically conductive paste and an electromagnetic wave shield. A silver-coated copper powder has a dendritic shape having a linearly grown main stem and a plurality of branches separated from the main stem, the main stem and the branches are constituted as flat plate-shaped copper particles having a cross-sectional average thickness of from 0.02 μm to 5.0 μm to be determined by scanning electron microscopic (SEM) observation gather, the surface of the copper particles is coated with silver, the average particle diameter (D50) of the silver-coated copper powder 1 is from 1.0 μm to 100 μm, and the maximum height in the vertical direction with respect to the flat plate-shaped surface of the copper particles is 1/10 or less with respect to the (Continued)

maximum length in the horizontal direction of the flat plate-shaped surface of the copper particles.

20 Claims, 6 Drawing Sheets

(51) Int. Cl.
    *B22F 1/02*     (2006.01)
    *B22F 9/24*     (2006.01)
    *C25C 5/02*     (2006.01)
    *C09D 5/32*     (2006.01)
    *C09D 11/037*     (2014.01)
    *C09D 7/40*     (2018.01)
    *C09D 7/62*     (2018.01)
    *C25C 1/12*     (2006.01)
    *C09D 5/24*     (2006.01)
    *C09D 11/52*     (2014.01)
    *H01B 1/02*     (2006.01)
    *C25D 3/38*     (2006.01)
    *C22C 9/00*     (2006.01)
    *C23C 18/54*     (2006.01)
    *C09D 7/61*     (2018.01)
    *C23C 18/42*     (2006.01)
    *C08K 3/08*     (2006.01)

(52) U.S. Cl.
CPC .......... *B22F 1/0059* (2013.01); *B22F 1/0062* (2013.01); *B22F 9/24* (2013.01); *C09D 5/24* (2013.01); *C09D 5/32* (2013.01); *C09D 7/61* (2018.01); *C09D 7/62* (2018.01); *C09D 7/70* (2018.01); *C09D 11/037* (2013.01); *C09D 11/52* (2013.01); *C22C 9/00* (2013.01); *C23C 18/42* (2013.01); *C23C 18/54* (2013.01); *C25C 1/12* (2013.01); *C25C 5/02* (2013.01); *C25D 3/38* (2013.01); *H01B 1/026* (2013.01); *H01B 1/22* (2013.01); *B22F 2301/255* (2013.01); *B22F 2304/10* (2013.01); *B22F 2999/00* (2013.01); *C08K 2003/085* (2013.01); *C08K 2003/0806* (2013.01); *Y02P 10/236* (2015.11)

(58) Field of Classification Search
CPC ...... B22F 1/004; B22F 2310/255; C09D 5/24; C09C 3/04; G21F 1/00; G21F 3/00
See application file for complete search history.

(56) References Cited

U.S. PATENT DOCUMENTS

| | | | |
|---|---|---|---|
| 4,944,797 A | 7/1990 | Kemp, Jr. et al. | |
| 5,945,158 A | 8/1999 | Djokic et al. | |
| 2002/0157957 A1 | 10/2002 | Saji et al. | |
| 2006/0226398 A1 | 10/2006 | Hori et al. | |
| 2007/0108062 A1 | 5/2007 | Brunner et al. | |
| 2014/0102910 A1 | 4/2014 | Rohde et al. | |
| 2014/0141238 A1 | 5/2014 | Yatsuka et al. | |
| 2014/0346413 A1 | 11/2014 | Inoue et al. | |
| 2017/0194073 A1 | 7/2017 | Takahashi et al. | |
| 2017/0253750 A1* | 9/2017 | Okada | C09C 3/06 |
| 2018/0051176 A1* | 2/2018 | Okada | B22F 1/00 |
| 2018/0079000 A1* | 3/2018 | Okada | B22F 1/00 |
| 2018/0111190 A1* | 4/2018 | Okada | B22F 1/00 |
| 2018/0154436 A1 | 6/2018 | Okada | |

FOREIGN PATENT DOCUMENTS

| | | |
|---|---|---|
| CN | 103056356 A | 4/2013 |
| EP | 3192597 A1 | 7/2017 |
| JP | 06-240464 A | 8/1994 |
| JP | 2000-248303 A | 9/2000 |
| JP | 2002-015622 A | 1/2002 |
| JP | 2003-258490 A | 9/2003 |
| JP | 2005-200734 A | 7/2005 |
| JP | 2006-161081 A | 6/2006 |
| JP | 2011-058027 A | 3/2011 |
| JP | 4697643 B2 | 6/2011 |
| JP | 2011-214032 A | 10/2011 |
| JP | 2012-153967 A | 8/2012 |
| JP | 2013-019034 A | 1/2013 |
| JP | 2013-053347 A | 3/2013 |
| JP | 2013-089576 A | 5/2013 |
| JP | 2013-100592 A | 5/2013 |
| JP | 2014-005531 A | 1/2014 |
| JP | 5503813 B1 | 5/2014 |
| JP | 2014-159646 A | 9/2014 |
| JP | 2015-105406 A | 6/2015 |
| JP | 5790900 B1 | 10/2015 |
| KR | 10-2013-0044132 A | 5/2013 |
| TW | 201313965 A | 4/2013 |
| TW | 201317311 A | 5/2013 |
| TW | 201413749 A | 4/2014 |
| WO | 2005/049584 A1 | 6/2005 |
| WO | 2015/060258 A1 | 4/2015 |
| WO | 2013/132831 A1 | 12/2018 |

OTHER PUBLICATIONS

Notice of Reasons for Rejection dated Dec. 15, 2015, issued to JP Application No. 2015-099807, (No English language translation provided).
Office Action dated Sep. 2, 2016, issued to TW Application No. 104135570, (No English language translation provided).
International Search Report dated Dec. 15, 2015, issued for PCT/JP2015/080258, (No English language translation provided).
International Search Report dated Jun. 23, 2015, issued to International Application No. PCT/JP2015/059485.
Office Action dated Dec. 12, 2017, issued to KR Patent Application No. 10-2017-7004059, (No English language translation provided).
Office Action dated Dec. 14, 2017, issued to U.S. Appl. No. 15/509,273.
Gökhan Orhan et al., "Effect of electrolysis parameters on the morphologies of copper powder obtained in a rotating cylinder electrode cell", Powder Technology, vol. 3, Mar. 2010, pp. 57-63. (cited in the Feb. 28, 2018 OA issued for CN201580046403.2).
Office Action dated Feb. 28, 2018, issued to CN Patent Application No. 201580046403.2, (No English language translation provided).
Office Action dated Nov. 30, 2018, issued in the CN Patent Application No. CN201580079931.8.
Extended European Search Report dated Dec. 17, 2018, in the EP Patent Application No. EP15892627.9.
Xiaoyun Zhu et al., "Electrochemical migration behavior of Ag-plated Cu-filled electrically conductive adhesives", Rare Metals—Xiyou Jinshu, vol. 31, No. 1, Jan. 26, 2012, pp. 64-70, XP055471122. (cited in the May 8, 2018 Search Report issued for EP15840059.8).
Xiaohei Liu et al., "Effect of Thixotropic Agent on the Properties of Conductive Silicone Rubber Gasket for EMI Shielding", Advanced Materials Research, vol. 239-242, May 1, 2011, pp. 3350-3353, XP055471124. (cited in the May 8, 2018 Search Report issued for EP15840059.8).
Extended European Search Report dated May 8, 2018, issued to EP Patent Application No. 15840059.8.
Office Action dated Apr. 18, 2016, issued in the TW Patent Application No. 104109957.
International Search Report including Written Opinion dated Jun. 23, 2015, issued to International Application No. PCT/JP2015/059482.
Office Action dated Oct. 9, 2018, issued in the CN Patent Application No. 201580077852.3.
Extended European Search Report dated Oct. 24, 2018, issued in the EP Patent Application No. EP15886411.6.
Office Action dated Jan. 9, 2019, issued in the KR Patent Application No. KR10-2017-7030444.

(56) References Cited

OTHER PUBLICATIONS

Office Action dated Jun. 19, 2019, issued in the related U.S. Appl. No. 15/560,721.

* cited by examiner

SILVER-COATED COPPER POWDER, COPPER PASTE USING SAME, CONDUCTIVE COATING MATERIAL, CONDUCTIVE SHEET, AND METHOD FOR PRODUCING SILVER-COATED COPPER POWDER

CROSS REFERENCE TO RELATED APPLICATIONS

This application is related to co-pending application: "COPPER POWDER, COPPER PASTE USING SAME, CONDUCTIVE COATING MATERIAL, CONDUCTIVE SHEET, AND METHOD FOR PRODUCING COPPER POWDER" filed even date herewith in the names of Hiroshi OKADA and Yu YAMASHITA as a national phase entry of PCT/JP2015/080263, which application is assigned to the assignee of the present application and is incorporated by reference herein.

TECHNICAL FIELD

The present invention relates to a copper powder (silver-coated copper powder) having the surface coated with silver, and it relates to a silver-coated copper powder which has a novel shape, is used as a material of an electrically conductive paste and the like, and can improve electrical conductivity, a copper paste, an electrically conductive coating material, and an electrically conductive sheet which use the same, and a method for producing the silver-coated copper powder.

BACKGROUND ART

A paste such as a resin type paste or a calcined type paste and a coating material such as an electromagnetic wave shielding coating material which use a metal filler such as a silver powder or a silver-coated copper powder are frequently used in the formation of a wiring layer, an electrode, and the like in an electronic device. An electrically conductive film to be a wiring layer or an electrode is formed by applying or printing a metal filler paste of a silver powder or a silver-coated copper powder on various kinds of substrates and then subjecting the coated metal filler paste to heat curing or heat calcination.

For example, a resin type electrically conductive paste is composed of a metal filler, a resin, a curing agent, a solvent, and the like, and it is formed into an electrically conductive film by being printed on an electric conductor circuit pattern or a terminal and cured by heating at from 100° C. to 200° C. so as to form a wire or an electrode. In a resin type electrically conductive paste, the thermosetting resin is cured and shrunk by heat, and metal fillers are thus joined by pressure and brought into contact with one another to overlap each other, and as a result, an electrically connected current path is formed. This resin type electrically conductive paste is used in a substrate using a material susceptible to heat such as a printed wiring board since this paste is treated at a curing temperature of 200° C. or lower.

On the other hand, a calcination type electrically conductive paste is composed of a metal filler, glass, a solvent, and the like, and it is formed into an electrically conductive film by being printed on an electric conductor circuit pattern or a terminal and calcined by heating at from 600° C. to 800° C. so as to form a wire or an electrode. The calcination type electrically conductive paste is treated at a high temperature so that the metal fillers are sintered together to secure the conduction property. This calcination type electrically conductive paste cannot be used in a printed wiring board using a resin material since it is treated at a high temperature for calcination in this manner, but it is possible to realize a low resistance as the metal fillers are sintered by the high temperature treatment. Hence, a calcination type electrically conductive paste is used in an external electrode of a laminated ceramic capacitor, and the like.

On the other hand, the electromagnetic wave shield is used to prevent the generation of electromagnetic noises from an electronic device, and particularly in recent years, the housing of a personal computer or a mobile phone is made of a resin, and a method to form a thin metal film by a vapor deposition method or a sputtering method, a method to apply an electrically conductive coating material, and a method to shield electromagnetic waves by attaching an electrically conductive sheet to a required place, and the like have been thus proposed in order to secure the electrical conductivity of the housing. Among them, a method in which a metal filler is dispersed in a resin and applied and a method in which a metal filler is dispersed in a resin and processed into a sheet shape and the sheet is attached to a housing are frequently used since these methods do not require special equipment in the processing step and thus exhibit an excellent degree of freedom.

However, in such a case of dispersing a metal filler in a resin and applying the resin or processing the resin into a sheet, the dispersion state of the metal filler in the resin is not uniform, and thus a method to increase the filling factor of the metal filler is required in order to obtain an electromagnetic wave shielding efficiency. However, in this case, problems that the flexibility of the resin sheet is impaired and the like are caused as well as the weight of the sheet increases by the addition of a great amount of metal filler. Hence, in order to solve these problems, for example, in Patent Document 1, a method using a flat plate-shaped metal filler is proposed and it is described that this makes it possible to form a thin sheet exhibiting an excellent electromagnetic wave shielding effect and also favorable flexibility.

Here, in order to fabricate a flat plate-shaped copper powder, for example, Patent Document 2 discloses a method for obtaining a flaky copper powder suitable for a filler of an electrically conductive paste. Specifically, a spherical copper powder having an average particle diameter of from 0.5 to 10 μm as a raw material is mechanically processed into a flat plate shape by mechanical energy of a medium filled in the mill by using a ball mill or a vibrating mill.

In addition, for example, Patent Document 3 discloses a copper powder for an electrically conductive paste, specifically, a discoid copper powder capable of obtaining high performance as a copper paste for through holes and external electrodes and a technique relating to a production method thereof. Specifically, a granular atomized copper powder is put into a medium stirring mill, a steel ball having a diameter of ⅛ to ¼ inch is used as a grinding medium, a fatty acid is added to the copper powder at from 0.5 to 1% by weight, and the granular atomized copper powder is ground in the air or an inert atmosphere to be processed into a flat plate shape.

On the other hand, a silver powder is frequently used as the metal filler to be used in these electrically conductive pastes and electromagnetic wave shields, but there is a tendency to use a silver-coated copper powder in which the amount of silver used is decreased by coating silver on the surface of a copper powder which is more inexpensive than a silver powder due to the cost saving trend.

As a method to coat the surface of a copper powder with silver, there are a method to coat the copper surface with silver by a substitution reaction and a method to coat the copper surface with silver in an electroless plating solution containing a reducing agent.

In the method to coat the copper surface with silver by a substitution reaction, a silver film is formed on the copper surface as the silver ion is reduced by the electrons generated when copper dissolves in the solution. For example, Patent Document 4 discloses a production method in which a silver film is formed on the copper surface by the substitution reaction between copper and the silver ion as a copper powder is put into a solution in which a silver ion is present. However, in this method by a substitution reaction, there is a problem that the amount of silver coated cannot be controlled since the dissolution of copper does not proceed any more when a silver film is formed on the copper surface.

In order to solve this problem, there is a method to coat silver by using an electroless plating solution containing a reducing agent. For example, Patent Document 5 proposes a method for producing a copper powder coated with silver by the reaction between a copper powder and silver nitrate in a solution in which a reducing agent is dissolved.

Meanwhile, as the copper powder, an electrolytic copper powder precipitated in a dendritic shape called a dendritic shape is known and it is characterized by a large surface area due to the dendritic shape thereof. By having a dendritic shape as described above, there is an advantage that the amount of an electrically conductive filler in an electrically conductive paste and the like can be decreased since the branches of the dendrite overlap each other, conduction is likely to occur, and the number of contact points between the particles is greater as compared to that of spherical particles in the case of using this in an electrically conductive film and the like. For example, Patent Documents 6 and 7 propose a silver-coated copper powder in which the surface of a copper powder having a dendritic shape is coated with silver.

Specifically, Patent Documents 6 and 7 disclose dendrites characterized by long branches branched from the main axis as one that is further grown in a dendritic shape, and it is described that the silver-coated copper powder exhibits improved conduction property as the contact points between the particles are more than those between the conventional dendrites and it can enhance the electrical conductivity when being used in an electrically conductive paste and the like even though the amount of the electrically conductive powder is decreased.

On the other hand, when the metal filler has a dendritically developed shape in the case of utilizing a dendritic copper powder as a metal filler of an electrically conductive paste, a resin for electromagnetic wave shielding, and the like, the electrolytic copper powders are intertwined with one another more than the required extent, and it is thus pointed out in Patent Document 8 that it is extremely difficult to handle the electrolytic copper powder and the productivity decreases as the aggregation thereof is likely to occur and the fluidity thereof decreases. Incidentally, it is described in Patent Document 8 that it is possible to improve the strength of the electrolytic copper powder itself, to make it difficult for the dendrite to break, and to mold the electrolytic copper powder to have a high strength by adding a tungstate salt to an aqueous solution of copper sulfate that is an electrolytic solution for precipitating the electrolytic copper powder in order to increase the strength of the electrolytic copper powder itself.

In this manner, it is not easy to use a dendritic copper powder as a metal filler of an electrically conductive paste and the like and the dendritic copper powder is also a cause of poor improvement in the electrical conductivity of the paste.

In order to secure the electrical conductivity, a dendritic shape having a three-dimensional shape is more likely to secure the contact points than a granular shape and is expected to secure high electrical conductivity as an electrically conductive paste or an electromagnetic wave shield. However, a silver-coated copper powder having a conventional dendritic shape is a dendrite characterized by a long branch branched from the main axis and has an elongated branch shape so that it has a simple structure from the viewpoint of securing the contact point and does not have an ideal shape as a shape to effectively secure the contact point by using a smaller amount of silver-coated copper powder.

Patent Document 1: Japanese Unexamined Patent Application, Publication No. 2003-258490
Patent Document 2: Japanese Unexamined Patent Application, Publication No. 2005-200734
Patent Document 3: Japanese Unexamined Patent Application, Publication No. 2002-15622
Patent Document 4: Japanese Unexamined Patent Application, Publication No. 2000-248303
Patent Document 5: Japanese Unexamined Patent Application, Publication No. 2006-161081
Patent Document 6: Japanese Unexamined Patent Application, Publication No. 2013-89576
Patent Document 7: Japanese Unexamined Patent Application, Publication No. 2013-100592
Patent Document 8: Japanese Unexamined Patent Application, Publication No. 2011-58027

DISCLOSURE OF THE INVENTION

Problems to be Solved by the Invention

The present invention has been proposed in view of such circumstances, and an object thereof is to provide a silver-coated copper powder which can be suitably utilized in applications such as an electrically conductive paste and an electromagnetic wave shield while securing excellent electrical conductivity by increasing the number of contact points between the copper powders.

Means for Solving the Problems

The inventors of the present invention have conducted intensive investigations to solve the problems described above. As a result, it has been found out that a silver-coated copper powder which has a dendritic shape having a main stem and a plurality of branches separated from the main stem and in which the main stem and the branches are constituted as flat plate-shaped copper particles having a specific cross-sectional average thickness gather, the surface of the copper particles is coated with silver, and the growth of the copper powder in the vertical direction with respect to the flat plate-shaped surface is suppressed forms a great number of contact points between the copper powders and exhibits excellent electrical conductivity, thereby completing the present invention. In other words, the present invention provides the following.

(1) A first aspect of the present invention is a silver-coated copper powder having a dendritic shape having a linearly grown main stem and a plurality of branches separated from the main stem, in which the main stem and the branches are constituted as flat plate-shaped copper particles having a cross-sectional average thickness of from 0.02 μm to 5.0 μm to be determined by scanning electron microscopic (SEM) observation gather, a surface of the copper particles is coated with silver, an average particle diameter (D50) of the silver-coated copper powder is from 1.0 µm to 100 µm, and a maximum height in a vertical direction with respect to a flat plate-shaped surface of the copper particles is 1/10 or less with respect to a maximum length in a horizontal direction of the flat plate-shaped surface.

(2) A second aspect of the present invention is the silver-coated copper powder according to the first aspect, in which an amount of silver coated is from 1% by mass to 50% by mass with respect to 100% by mass of the entire silver-coated copper powder coated with silver.

(3) A third aspect of the present invention is the silver-coated copper powder according to the first or second aspect, in which a bulk density of the silver-coated copper powder is in a range of from 0.5 g/cm³ to 5.0 g/cm³.

(4) A fourth aspect of the present invention is the silver-coated copper powder according to any one of the first to third aspects, in which a BET specific surface area value of the silver-coated copper powder is from 0.2 m²/g to 5.0 m²/g.

(5) A fifth aspect of the present invention is a metal filler containing the silver-coated copper powder according to any one of the first to fourth aspects at a proportion of 20% by mass or more to the entire metal filler.

(6) A sixth aspect of the present invention is an electrically conductive paste containing the metal filler according to the fifth aspect mixed with a resin.

(7) A seventh aspect of the present invention is an electrically conductive coating material for electromagnetic wave shielding using the metal filler according to the fifth aspect.

(8) An eighth aspect of the present invention is an electrically conductive sheet for electromagnetic wave shielding using the metal filler according to the fifth aspect.

(9) A ninth aspect of the present invention is a method for producing the silver-coated copper powder according to any one of the first to fourth aspects, which includes a step of precipitating a copper powder from an electrolytic solution on a cathode by an electrolytic method and a step of coating the copper powder with silver and in which electrolysis is conducted by using the electrolytic solution containing a copper ion, one or more kinds of compounds which have a phenazine structure and are represented by the following Formula (1), and one or more kinds of nonionic surfactants.

[Chem. 1]

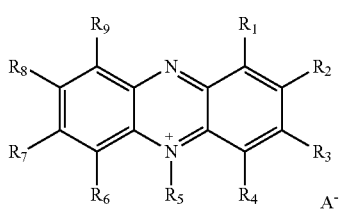

(1)

[In Formula (1), $R_1$, $R_2$, $R_3$, $R_4$, $R_6$, $R_7$, $R_8$, and $R_9$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_5$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion.]

(10) A tenth aspect of the present invention is a method for producing the silver-coated copper powder according to any one of the first to fourth aspects, which includes a step of precipitating a copper powder from an electrolytic solution on a cathode by an electrolytic method and a step of coating the copper powder with silver and in which electrolysis is conducted by using the electrolytic solution containing a copper ion, one or more kinds of compounds which have an azobenzene structure and are represented by the following Formula (2), and one or more kinds of nonionic surfactants.

[Chem. 2]

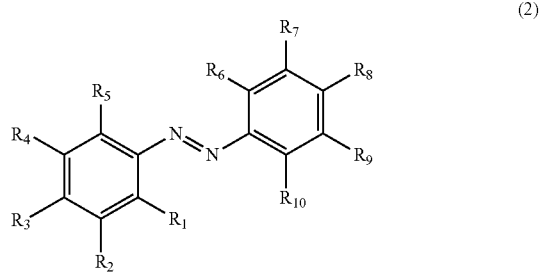

(2)

[In Formula (2), $R_1$, $R_2$, $R_3$, $R_4$, $R_5$, $R_6$, $R_7$, $R_8$, $R_9$, and $R_{10}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl.]

(11) An eleventh aspect of the present invention is a method for producing the silver-coated copper powder according to any one of the first to fourth aspects, which includes a step of precipitating a copper powder from an electrolytic solution on a cathode by an electrolytic method and a step of coating the copper powder with silver and in which electrolysis is conducted by using the electrolytic solution containing a copper ion, one or more kinds of compounds which have a phenazine structure and an azobenzene structure and are represented by the following Formula (3), and one or more kinds of nonionic surfactants.

[Chem. 3]

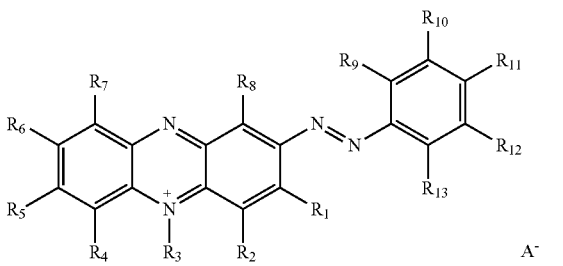

(3)

[In Formula (3), $R_1$, $R_2$, $R_4$, $R_5$, $R_6$, $R_7$, $R_8$, $R_9$, $R_{10}$, $R_{11}$, $R_{12}$, and $R_{13}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_3$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion.]

(12) A twelfth aspect of the present invention is a method for producing the silver-coated copper powder according to any one of the first to fourth aspects, which includes a step of precipitating a copper powder from an electrolytic solution on a cathode by an electrolytic method and a step of coating the copper powder with silver and in which electrolysis is conducted by using the electrolytic solution containing a copper ion, two or more kinds selected from the group consisting of a compound which has a phenazine structure and is represented by the following Formula (1), a compound which has an azobenzene structure and is represented by the following Formula (2), and a compound which has a phenazine structure and an azobenzene structure and is represented by the following Formula (3), and one or more kinds of nonionic surfactants.

[Chem. 4]

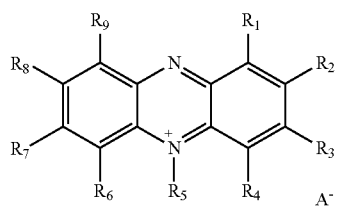

(1)

[In Formula (1), $R_1$, $R_2$, $R_3$, $R_4$, $R_6$, $R_7$, $R_8$, and $R_9$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_5$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion.]

[Chem. 5]

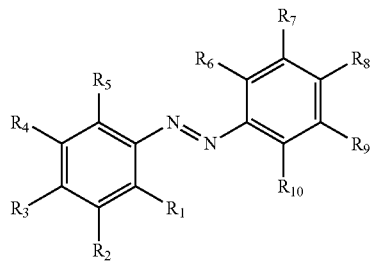

(2)

[In Formula (2), $R_1$, $R_2$, $R_3$, $R_4$, $R_5$, $R_6$, $R_7$, $R_8$, $R_9$, and $R_{10}$ are each independently a group selected from the group consisting of hydrogen, a halogen, amino, OH, =O, CN, SCN, SH, COOH, a COO salt, a COO ester, $SO_3H$, a $SO_2$ salt, a $SO_2$ ester, benzenesulfonic acid, a lower alkyl, and an aryl.]

[Chem. 6]

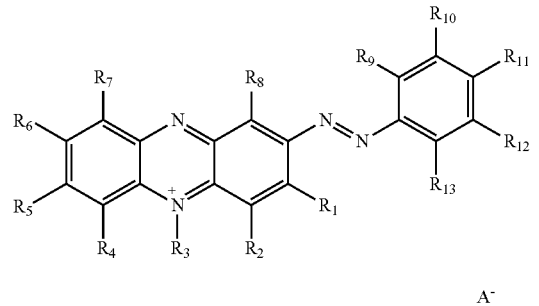

(3)

[In Formula (3), $R_1$, $R_2$, $R_4$, $R_5$, $R_6$, $R_7$, $R_8$, $R_9$, $R_{10}$, $R_{11}$, $R_{12}$, and $R_{13}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_3$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion.]

Effects of the Invention

According to the silver-coated copper powder of the present invention, it is possible to secure a great number of contact points and to increase the contact area, and it is possible to suitably utilize the silver-coated copper powder in applications such as an electrically conductive paste and an electromagnetic wave shield by securing excellent electrical conductivity and prevent the aggregation thereof.

PREFERRED MODE FOR CARRYING OUT THE INVENTION

Hereinafter, specific embodiments (hereinafter referred to as the "present embodiment") of silver-coated copper powder according to the present invention will be described in detail with reference to the drawings. Incidentally, the present invention is not limited to the following embodiments, and various modifications are possible without changing the gist of the present invention. In addition, in the present specification, the notation "X to Y" (X and Y are arbitrary numerical values) means "X or more and Y or less".

<<1. Dendritic Silver-Coated Copper Powder>>

The silver-coated copper powder according to the present embodiment is a silver-coated copper powder which has a dendritic shape having a linearly grown main stem and a plurality of branches separated from the main stem (hereinafter, the silver-coated copper powder according to the present embodiment is also referred to as a "dendritic silver-coated copper powder") and in which the main stem and the branches are constituted as flat plate-shaped copper particles having a specific cross-sectional average thickness gather and the surface of these flat plate-shaped copper particles is coated with silver when observed through a scanning electron microscope (SEM).

Specifically, in the dendritic silver-coated copper powder according to the present embodiment, the main stem and the branches are constituted as flat plate-shaped copper particles having a cross-sectional average thickness of from 0.02 µm to 5.0 µm to be determined by scanning electron microscopic (SEM) observation gather and the average particle diameter (D50) of the silver-coated copper powder is from 1.0 µm to 100 µm. Moreover, in this dendritic silver-coated copper powder, the height in the vertical direction with respect to the flat plate-shaped surface of the flat plate-shaped copper particles is 1/10 or less with respect to the maximum length in the horizontal direction, the growth of this dendritic copper powder in the vertical direction is suppressed, and this dendritic copper powder thus has a smooth surface.

A dendritic silver-coated copper powder 1 according to the present embodiment can be fabricated, for example, by coating the surface of a copper powder obtained by being precipitated on the cathode by immersing an anode and a cathode in an electrolytic solution which exhibits acidity by sulfuric acid and contains a copper ion and applying a direct current to the electrolytic solution for electrolysis with silver although the details will be described later.

Figure 1:
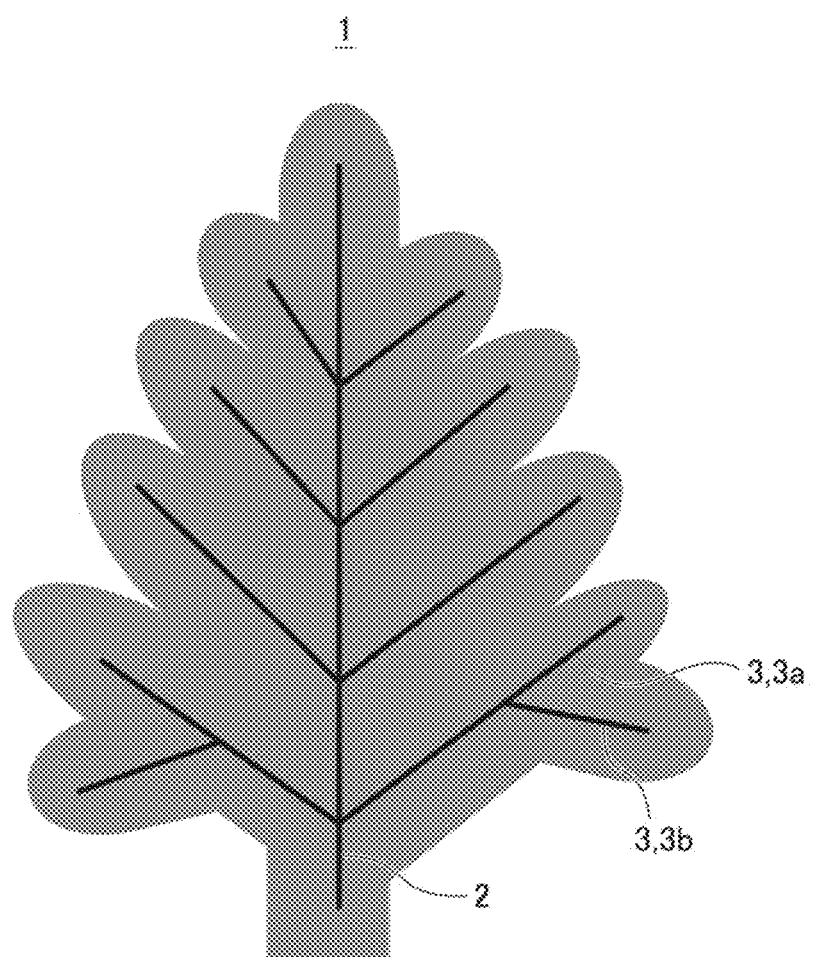
FIG. 1 is a diagram which schematically illustrates a specific shape of a dendritic silver-coated copper powder.
Figure 2:
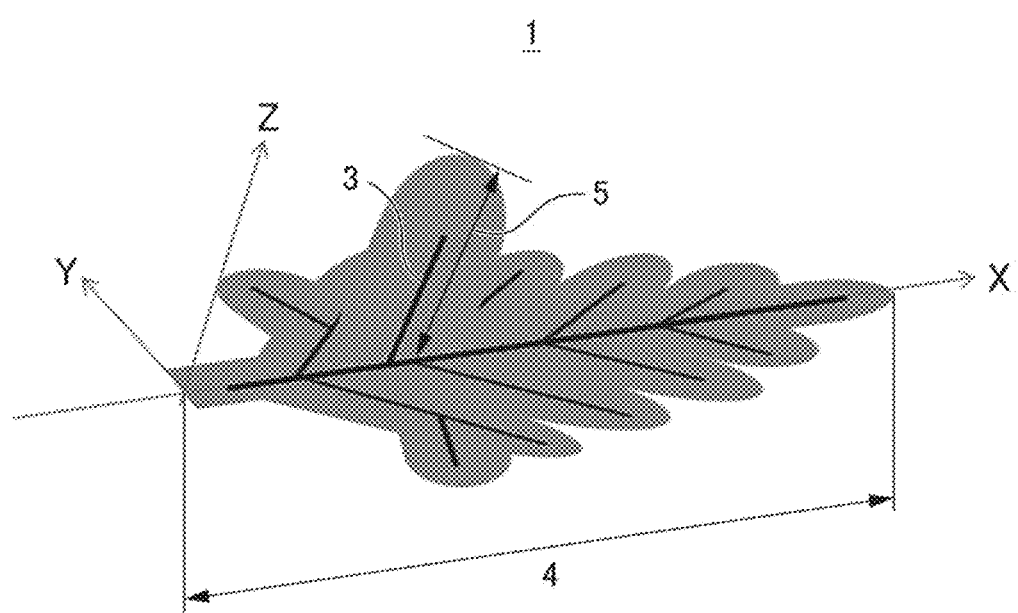
FIG. 2 is a diagram which schematically illustrates a specific shape of a dendritic silver-coated copper powder.

FIGS. 1 and 2 are diagrams which schematically illustrate the specific shape of the dendritic silver-coated copper powder according to the present embodiment. As illustrated in FIG. 1, this dendritic silver-coated copper powder 1 has a dendritic shape having a main stem 2 which has linearly grown and a plurality of branches 3 which are separated from the main stem 2. Incidentally, the branches 3 in the dendritic silver-coated copper powder 1 mean not only the branches 3a and 3b which have branched from the main stem 2 but also branches which have further branched from the branches 3a and 3b.

Moreover, the main stem 2 and the branches 3 are constituted as flat plate-shaped copper particles having a cross-sectional average thickness of from 0.02 µm to 5.0 µm to be determined by SEM observation gather as described above. It is considered that such flat plate-shaped copper particles are formed since the growth of the copper particles is suppressed as specific additives added to the electrolytic solution adsorb to the surface of the copper particles when electrolytic deposition of copper powder is performed and, as a result, the copper particles grow in a flat plate shape as to be described later. Incidentally, the silver-coated copper powder 1 is constituted as the surface of such flat plate-shaped copper particles is coated with silver.

However, when the growth of copper powder also occurs, for example, in the vertical direction (Z direction in FIG. 2) with respect to the flat plate-shaped surface illustrated in FIG. 2, the copper particles themselves of the branches which have respectively grown have a flat plate shape but a copper powder in which the copper particles have also grown in the vertical direction like protrusions is formed. Incidentally, FIG. 2 is a diagram which illustrates the horizontal direction (flat plate direction) to the flat plate-shaped surface and the vertical direction with respect to the flat plate-shaped surface, and the flat plate direction refers to the X-Y direction and the vertical direction refers to the Z direction.

Figure 3:
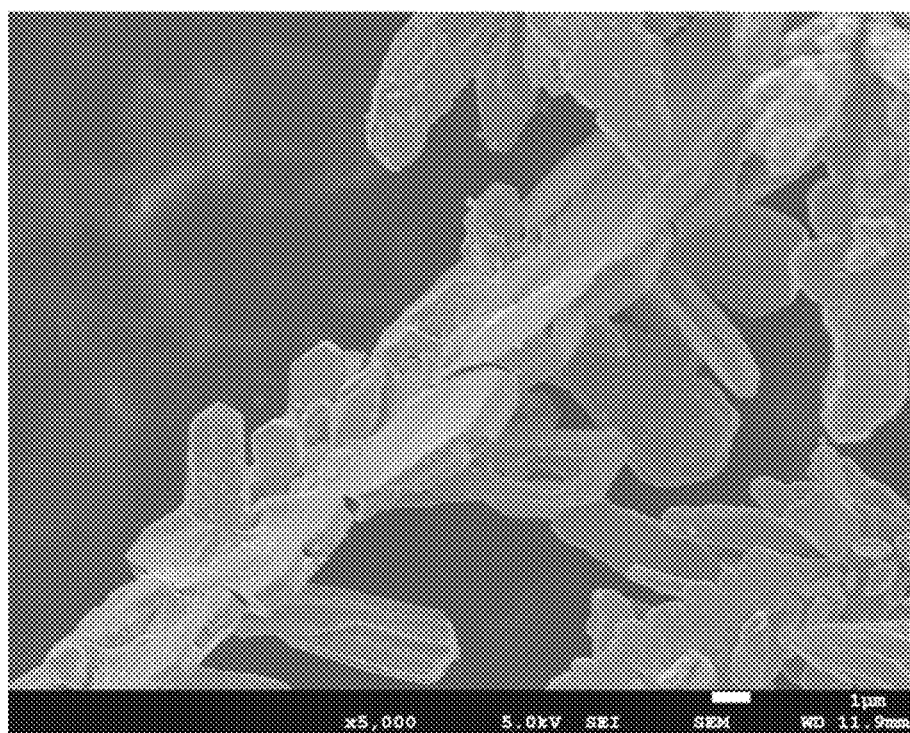
FIG. 3 is a photograph which illustrates an observation image when a dendritic copper powder before being coated with silver as a conventional example is observed through a scanning electron microscope (SEM) at 5,000-times magnification.

Here, FIG. 3 is a photograph which illustrates an example of the observation images when the copper powder also grown in the vertical direction with respect to the flat plate-shaped surface is observed through a SEM (5,000-times magnification) in the dendritic copper powder before being coated with silver. In the dendritic copper powder illustrated in this photograph, the copper particles grow in the vertical direction with respect to the flat plate-shaped surface to form protrusions and a part of the flat plate-shaped surface is bent to have a shape having a height in the vertical direction.

When copper particles grow in the vertical direction as illustrated in the photograph of FIG. 3, a problem arises that the copper powder grows bulky due to the growth of the copper particles in the vertical direction so that the filling density is not achieved and the electrical conductivity cannot be sufficiently secured, for example, in the case of utilizing a silver-coated copper powder fabricated based on this copper powder in applications such as an electrically conductive paste and an electrically conductive coating material.

On the contrary, the silver-coated copper powder 1 according to the present embodiment is a copper powder having a substantially smooth surface by suppressing the growth thereof in the vertical direction with respect to the flat plate-shaped surface. Specifically, as illustrated in FIG. 2, in the silver-coated copper powder 1, the maximum height (the symbol "5" in FIG. 2) in the vertical direction with respect to the flat plate-shaped surface is 1/10 or less with respect to the maximum length (the symbol "4" in FIG. 2) to be the long length in the horizontal direction of the flat plate-shaped surface. Incidentally, the maximum height 5 in the vertical direction with respect to the flat plate-shaped surface is not the thickness of the flat plate-shaped surface but is the height of the protrusion, for example, in a case in which a protrusion is formed on the flat plate-shaped surface, and the thickness direction based on the flat plate-shaped "surface" means the "height" in the opposite direction. In addition, the maximum length 4 in the horizontal direction with respect to the flat plate-shaped surface means the length of major axis of the flat plate-shaped surface.

Figure 4:
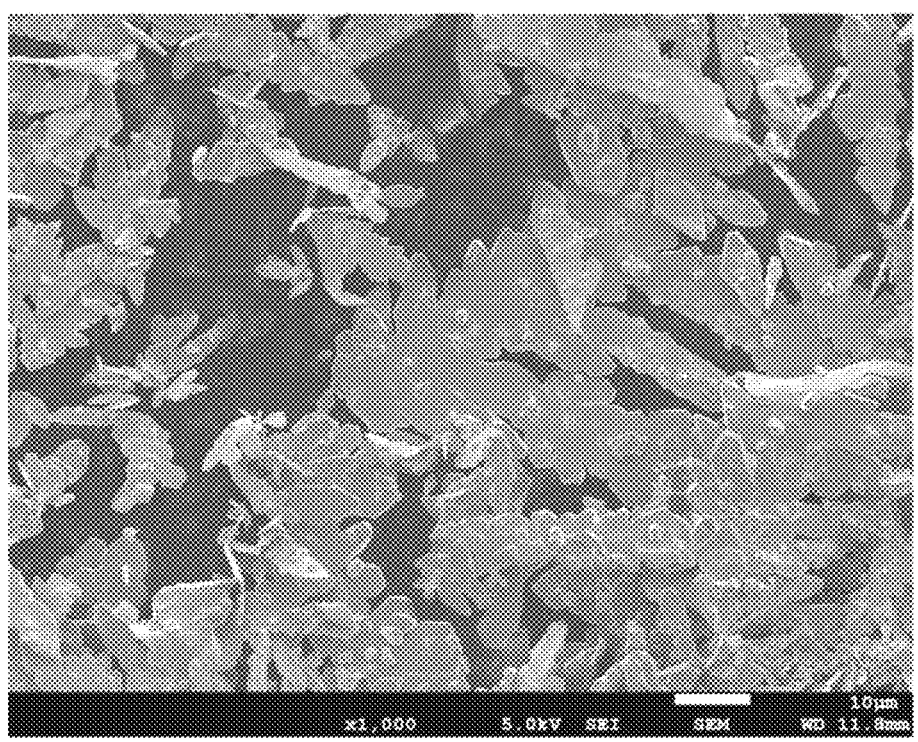
FIG. 4 is a photograph which illustrates an observation image when a dendritic copper powder before being coated with silver is observed through a scanning electron microscope (SEM) at 1,000-times magnification.
Figure 5:
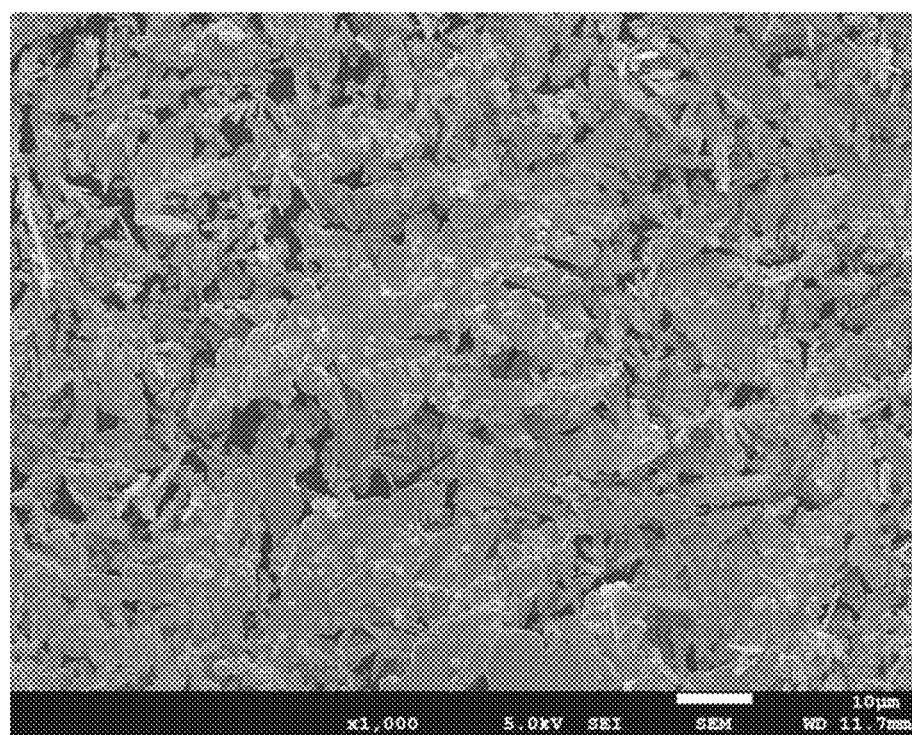
FIG. 5 is a photograph which illustrates an observation image when a dendritic silver-coated copper powder is observed through a scanning electron microscope (SEM) at 1,000-times magnification.
Figure 6:
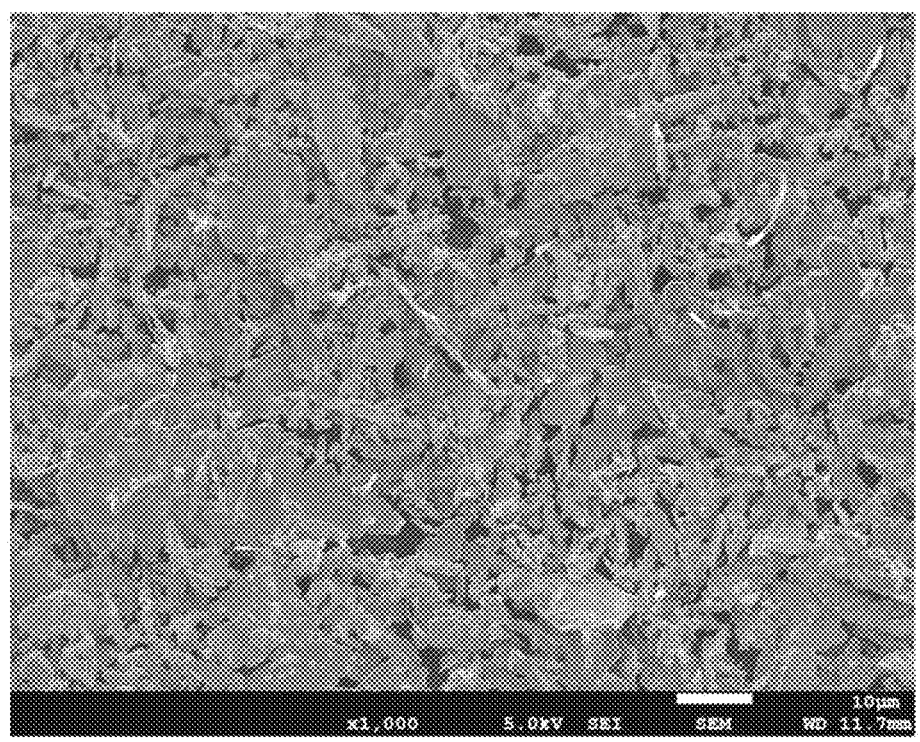
FIG. 6 is a photograph which illustrates an observation image when a dendritic silver-coated copper powder is observed through a scanning electron microscope (SEM) at 1,000-times magnification.

Here, FIG. 4 is a photograph which illustrates an example of the observation images when the dendritic copper powder before being coated with silver is observed through a SEM (1,000-times magnification), namely, the observation images of a flat plate-shaped dendritic copper powder of which the growth in the vertical direction with respect to the flat plate-shaped surface is suppressed. In addition, FIG. 5 is a photograph which illustrates the observation image when the dendritic silver-coated copper powder which is obtained by coating silver on the dendritic copper powder of which the growth in the vertical direction is suppressed and illustrated in FIG. 4 is observed through a SEM (1,000-times magnification). In addition, FIG. 6 is a photograph which illustrates the observation image when another place of the dendritic silver-coated copper powder obtained by coating silver on the dendritic copper powder of which the growth in the vertical direction is suppressed is observed through a SEM (1,000-times magnification) in the same manner. As illustrated in these photographs, it is understood that the dendritic silver-coated copper powder is a dendritic and flat plate-shaped copper powder of which the growth in the vertical direction with respect to the flat plate-shaped surface is suppressed and which thus has a substantially smooth surface.

By being such a flat plate-shaped silver-coated copper powder 1 of which the growth in the vertical direction is suppressed, it is possible to secure a large contact area between the copper powders. Moreover, it is possible to realize a low resistance, namely, a high electrical conductivity as the contact area increases. This makes it possible to further improve the electrical conductivity and to favorably maintain the electrical conductivity, and the flat plate-shaped silver-coated copper powder 1 can be suitably used in applications such as an electrically conductive coating material and an electrically conductive paste. In addition, the dendritic silver-coated copper powder 1 can contribute to thinning of the wiring material and the like as it is constituted as flat plate-shaped copper particles gather.

As described above, the flat plate-shaped copper particles which are coated with silver and constitute the main stem 2 and the branches 3 in the dendritic silver-coated copper powder 1 have a cross-sectional average thickness of from 0.02 µm to 5.0 µm. The effect as a flat plate is further exerted when the cross-sectional average thickness of flat plate-shaped copper particles coated with silver is thinner. In other words, as the main stem 2 and the branches 3 are constituted by flat plate-shaped copper particles which are coated with silver and have a cross-sectional average thickness of 5.0 µm or less, it is possible to secure a large contact area between the copper particles and between the dendritic silver-coated copper powders 1 constituted by the copper particles.

Incidentally, as the cross-sectional average thickness of the flat plate-shaped copper particles coated with silver decreases, the number of contact points when the dendritic silver-coated copper powders 1 come into contact with each other decreases. It is possible to secure a sufficient number of contact points when the cross-sectional average thickness of the copper particles coated with silver is 0.02 µm or more, the cross-sectional average thickness is more preferably 0.2 µm or more, and it is possible to effectively increase the number of contact points when the cross-sectional average thickness is 0.2 µm or more.

In addition, the average particle diameter (D50) of the dendritic silver-coated copper powder 1 according to the present embodiment is from 1.0 µm to 100 µm. The average particle diameter can be controlled by changing the conditions for electrolysis to be described later. In addition, it is possible to further adjust the average particle diameter to a desired size by conducting mechanical grinding or crushing by a jet mill, a sample mill, a cyclone mill, a bead mill, or the like if necessary. Incidentally, the average particle diameter (D50) can be measured by, for example, a laser diffraction/scattering type particle size distribution measuring method.

Here, for example, as pointed out in Patent Document 1 as well, examples of the problem of a dendritic silver-coated copper powder may include the fact that the dendritic copper powders are intertwined with one another to cause aggregation but do not uniformly dispersed in the resin as the metal filler in the resin has a dendritically developed shape in the case of utilizing the dendritic silver-coated copper powder as a metal filler of an electrically conductive paste, a resin for electromagnetic wave shielding, and the like. In addition, the viscosity of the paste increases by the aggregation, and this causes a problem in wiring formation by printing. This occurs since the shape (particle diameter) of the dendritic silver-coated copper powder is large, and it is required to decrease the shape of the dendritic silver-coated copper powder in order to solve this problem while making effective use of the dendritic shape. However, the dendritic shape cannot be secured when the particle diameter of the dendritic silver-coated copper powder is too small. Hence, it is required that the dendritic silver-coated copper powder has a size equal to or larger than a predetermined size in order to secure the effect of having a dendritic shape, namely the effect that the dendritic silver-coated copper powder has a large surface area and exhibits excellent moldability and sinterability by having a three-dimensional shape and can be molded to have a high strength by being strongly connected via the branch places.

In this regard, the surface area increases and favorable moldability and sinterability can be secured as the dendritic silver-coated copper powder 1 according to the present embodiment has an average particle diameter of from 1.0 µm to 100 µm. Moreover, this dendritic silver-coated copper powder 1 has a dendritic shape and the main stem 2 and the branches 3 are constituted by an assembly of flat plate-shaped copper particles, and it is thus possible to secure more contact points between the copper powders by the three-dimensional effect of being dendritic and the effect that the copper particles constituting the dendritic shape have a flat plate shape.

As a method for fabricating a flat plate-shaped silver-coated copper powder, a method in which the silver-coated copper powder is formed into a flat plate shape by a mechanical method is presented as described in Patent Document 2 and Patent Document 3. In this mechanical method, for example, in the case of forming the spherical copper powder into a flat plate shape, it is required to prevent the oxidation of copper at the time of mechanical processing, and the spherical copper powder is thus processed into a flat plate shape by adding a fatty acid to the spherical copper powder and grinding the spherical copper powder in the air or an inert atmosphere. However, there are cases in which it is impossible to completely prevent the oxidation and the fatty acid added at the time of processing affects the dispersibility when forming a paste, and it is thus required to remove the fatty acid after the processing is completed, but the fatty acid is firmly attached to the copper surface by the pressure at the time of mechanical processing in some cases, and a problem arises that the fatty acid cannot be completely removed, and the attachment of an oxide film or a fatty acid causes an increase in resistance in the case of utilizing the copper powder as a metal filler of an electrically conductive paste, a resin for electromagnetic wave shielding, and the like.

On the contrary, the dendritic silver-coated copper powder 1 according to the present embodiment can be formed into a flat plate shape by directly growing the copper powder through electrolysis without conducting mechanical processing, and thus the problem of oxidation and the problem due to the residual fatty acid which have so far been a problem in the mechanical method do not arise, a copper powder having a surface in a favorable state is obtained, the copper powder can be in an extremely favorable state in terms of electrical conductivity, and a low resistance can be realized in the case of using the copper powder as a metal filler of an electrically conductive paste, a resin for electromagnetic wave shielding, and the like. Incidentally, the method for producing this dendritic silver-coated copper powder 1 will be described later in detail.

In addition, the filling factor of the metal filler is important in order to realize a lower resistance. In order to further increase the filling factor, smoothness of the flat plate-shaped dendritic silver-coated copper powder is required. In other words, the smoothness is high, the filling factor increases, the number of contact points on the face of the copper powders increases, and a lower resistance can be thus realized as the form of the dendritic silver-coated copper powder 1 according to the present embodiment is that the maximum height in the vertical direction with respect to the flat plate-shaped surface is 1/10 or less with respect to the maximum length in the horizontal direction with respect to the flat plate-shaped surface.

<<2. Amount of Silver Coated>>

As described above, the dendritic silver-coated copper powder 1 according to the present embodiment is one constituted in a dendritic shape by copper particles which has a flat plate shape having a cross-sectional average thickness of from 0.02 μm to 5.0 μm and of which the surface is coated with silver. Hereinafter, the coating of silver on the surface of the silver-coated copper powder will be described.

The dendritic silver-coated copper powder 1 according to the present embodiment is one in which silver is coated on a dendritic copper powder before being coated with silver at a proportion of preferably from 1% by mass to 50% by mass with respect to 100% by mass of the entire silver-coated copper powder coated with silver, and silver is coated as an extremely thin coating film having a thickness (coated thickness) of silver of 0.1 μm or less and preferably 0.05 μm or less. From this fact, the dendritic silver-coated copper powder 1 has a shape holding the shape of the dendritic copper powder before being coated with silver as it is. Hence, both the shape of the copper powder before being coated with silver and the shape of the silver-coated copper powder after the copper powder is coated with silver have a dendritic shape.

As described above, the amount of silver coated on the dendritic silver-coated copper powder 1 is preferably in a range of from 1% by mass to 50% by mass with respect to 100% by mass of the entire silver-coated copper powder 1 coated with silver. It is preferable that the amount of silver coated is as small as possible from the viewpoint of cost, but a uniform silver film on the surface of the copper powder cannot be secured and a decrease in electrical conductivity is caused when the amount of silver coated is too small. Hence, the amount of silver coated is preferably 1% by mass or more, more preferably 2% by mass or more, and still more preferably 5% by mass or more with respect to 100% by mass of the entire silver-coated copper powder 1 coated with silver.

On the other hand, it is not preferable that the amount of silver coated is increased from the viewpoint of cost, and there is a possibility that the fine convex portions on the surface of copper particles constituting the dendritic silver-coated copper powder 1 disappear when silver is coated on the surface of the copper powder more than the required amount. From this fact, the amount of silver coated is preferably 50% by mass or less, more preferably 20% by mass or less, and still more preferably 10% by mass or less with respect to 100% by mass of the entire silver-coated copper powder 1 coated with silver.

In addition, in the dendritic silver-coated copper powder 1 according to the present embodiment, the average thickness of silver coated on the surface of the dendritic copper powder is about from 0.001 μm to 0.1 μm and preferably from 0.005 μm to 0.02 μm. When the thickness of silver coated is less than 0.001 μm on average, it is impossible to secure a uniform coating of silver on the surface of the copper powder and a decrease in electrical conductivity is also caused. On the other hand, when the thickness of silver coated exceeds 0.1 μm on average, it is not preferable from the viewpoint of cost.

In this manner, the average thickness of silver coated on the surface of the dendritic copper powder is 0.1 μm or less and this is smaller than the cross-sectional average thickness (0.02 μm to 5.0 μm) of the flat plate-shaped copper particles constituting the dendritic copper powder before being coated with silver. Hence, the cross-sectional average thickness of flat plate-shaped copper particles does not substantially change before and after the surface of the dendritic copper powder is coated with silver.

The bulk density of the dendritic silver-coated copper powder 1 is not particularly limited, but it is preferably in a range of from 0.5 g/cm$^3$ to 5.0 g/cm$^3$. When the bulk density is less than 0.5 g/cm$^3$, there is a possibility that the contact points between the silver-coated copper powders 1 cannot be sufficiently secured. On the other hand, when the bulk density exceeds 5.0 g/cm$^3$, the average particle diameter of the dendritic silver-coated copper powder 1 also increases so that the surface area decreases and the moldability and sinterability deteriorate in some cases.

In addition, the BET specific surface area value of the dendritic silver-coated copper powder 1 according to the present embodiment is not particularly limited, but it is preferably from 0.2 m$^2$/g to 5.0 m$^2$/g. When the BET specific surface area value is less than 0.2 m$^2$/g, the copper particles coated with silver do not have a desired shape as described above and high electrical conductivity is not obtained in some cases. On the other hand, when the BET specific surface area value exceeds 5.0 m$^2$/g, there is a possibility that the surface of the dendritic silver-coated copper powder 1 is ununiformly coated with silver and high electrical conductivity is not obtained. In addition, the copper particles constituting the silver-coated copper powder 1 are too fine and the silver-coated copper powder is in a state of fine whiskers, so that the electrical conductivity decreases in some cases. Incidentally, the BET specific surface area can be measured in conformity with JIS Z 8830: 2013.

Incidentally, it is possible to obtain the same effect as a copper powder composed only of the dendritic silver-coated copper powder although silver-coated copper powders having shapes other than the shape described above are mixed in the silver-coated copper powders obtained as long as the dendritic silver-coated copper powder having the shape as described above accounts for a predetermined proportion in the silver-coated copper powders obtained when observed through an electron microscope. Specifically, silver-coated copper powders having shapes other than the shape described above may be contained in the copper powders obtained as long as the dendritic silver-coated copper powder having the shape described above accounts for a proportion of 80% by number or more and preferably 90% by number or more in the entire silver-coated copper powders when observed through an electron microscope (for example, 500-times to 20,000-times).

<<3. Production Method of Silver-Coated Copper Powder>>

Next, a method for producing the dendritic silver-coated copper powder 1 according to the present embodiment will be described. Hereinafter, a method for producing the dendritic copper powder constituting the dendritic silver-coated copper powder will be described first, and a method for obtaining a dendritic silver-coated copper powder by coating the dendritic copper powder with silver will be subsequently described.

<3-1. Production Method of Copper Powder>

The dendritic copper powder according to the present embodiment can be produced by a predetermined electrolytic method using, for example, a solution which exhibits acidity by sulfuric acid and contains a copper ion as an electrolytic solution.

Upon electrolysis, for example, the electrolytic solution which exhibits acidity by sulfuric acid and contains a copper ion described above is accommodated in an electrolytic cell in which metallic copper is installed as the anode and a stainless steel plate, a titanium plate, or the like is installed as the cathode and an electrolytic treatment is conducted by applying a direct current to the electrolytic solution at a predetermined current density. This makes it possible to precipitate (electrodeposit) a fine dendritic copper powder on the cathode along with electric current application. Particularly, in the present embodiment, it is possible to precipitate a flat plate-shaped dendritic copper powder constituted as flat plate-shaped copper particles gather by adding a specific additive, a nonionic surfactant, and a chloride ion to the electrolytic solution which exhibits acidity by sulfuric acid and contains a water soluble copper salt to be a copper ion source.

(1) Copper Ion

The water-soluble copper salt is a copper ion source for supplying a copper ion, and examples thereof may include copper sulfate such as copper sulfate pentahydrate, and copper nitrate, but the water-soluble copper salt is not limited thereto. In addition, copper oxide may be dissolved in a sulfuric acid solution to form a solution exhibiting acidity by sulfuric acid. The concentration of the copper ion in the electrolytic solution can be set to about from 1 g/L to 20 g/L and preferably about from 5 g/L to 10 g/L.

(2) Sulfuric Acid

Sulfuric acid is one for preparing an electrolytic solution exhibiting acidity by sulfuric acid. The concentration of sulfuric acid in the electrolytic solution can be set to about from 20 g/L to 300 g/L and preferably about from 50 g/L to 150 g/L as the concentration of free sulfuric acid. This concentration of sulfuric acid affects the electrical conductivity of the electrolytic solution and it thus affects the uniformity of the copper powder to be obtained on the cathode.

(3) Additive

As an additive, any one or more kinds of compounds selected from the group consisting of a compound having a phenazine structure, a compound having an azobenzene structure, and a compound having a phenazine structure and an azobenzene structure or two or more kinds of compounds which have different molecular structures and are selected from the group described above are used concurrently. In the present embodiment, it is possible to produce a copper powder of which the growth in the vertical direction with respect to the flat plate-shaped surface is suppressed, namely, a copper powder having a smooth surface by adding such an additive to the electrolytic solution together with a nonionic surfactant to be described later.

The concentration of the additive selected from the group consisting of a compound having a phenazine structure, a compound having an azobenzene structure, and a compound having a phenazine structure and an azobenzene structure in the electrolytic solution is preferably about from 1 to 1000 mg/L in total of the compounds to be added.

(Compound Having Phenazine Structure)

A compound having a phenazine structure can be represented by the following Formula (1). In the present embodiment, one kind or two or more kinds of compounds which have a phenazine structure and are represented by the following Formula (1) can be contained as an additive.

[Chem. 7]

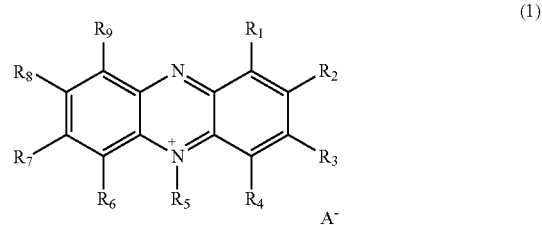

(1)

Here, in Formula (1), $R_1$, $R_2$, $R_3$, $R_4$, $R_6$, $R_7$, $R_8$, and $R_9$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl. In addition, $R_5$ is a group selected from the group consisting of hydrogen, a halogen, amino, OH, —O, CN, SCN, SH, COOH, a COO salt, a COO ester, $SO_3H$, a $SO_3$ salt, a $SO_3$ ester, benzenesulfonic acid, a lower alkyl, and an aryl. In addition, $A^-$ is a halide anion.

Specific examples of the compound having a phenazine structure may include 5-methylphenazin-5-ium, aeruginosin B, aeruginosin A, 5-ethylphenazin-5-ium, 3,7-diamino-5-phenylphenazin-5-ium, 5-ethylphenazin-5-ium, 5-methylphenazin-5-ium, 3-amino-5-phenyl-7-(diethylamino)phenazin-5-ium, 2,8-dimethyl-3,7-diamino-5-phenylphenazin-5-ium, 1-methoxy-5-methylphenazin-5-ium, 3-amino-7-(dimethylamino)-1,2-dimethyl-5-(3-sulfonatophenyl)phenazin-5-ium, 1,3-diamino-5-methylphenazin-5-ium, 1,3-diamino-5-phenylphenazin-5-ium, 3-amino-7-(diethylamino)-2-methyl-5-phenylphenazin-5-ium, 3,7-bis(diethylamino)-5-phenylphenazin-5-ium, 2,8-dimethyl-3,7-diamino-5-(4-methylphenyl)phenazin-5-ium, 3-(methylamino)-5-methylphenazin-5-ium, 3-hydroxy-7-(diethylamino)-5-phenylphenazin-5-ium, 5-azoniaphenazine, 1-hydroxy-5-methylphenazin-5-ium, 4H,6H-5-phenyl-3,7-dioxophenazin-5-ium, Anilinoaposafranin, Phenosafranine, and Neutral Red.

(Compound Having Azobenzene Structure)

A compound having an azobenzene structure can be represented by the following Formula (2). In the present embodiment, one kind or two or more kinds of compounds which have an azobenzene structure and are represented by the following Formula (2) can be contained as an additive.

[Chem. 8]

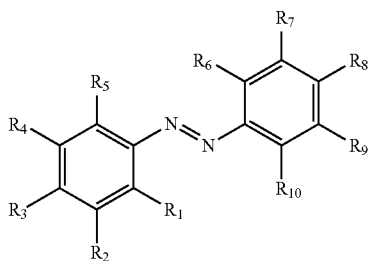

(2)

Here, in Formula (2), $R_1$, $R_2$, $R_3$, $R_4$, $R_5$, $R_6$, $R_7$, $R_8$, $R_9$, and $R_{10}$ are each independently a group selected from the group consisting of hydrogen, a halogen, amino, OH, =O, CN, SCN, SH, COOH, a COO salt, a COO ester, SO$_3$H, a SO$_3$ salt, a SO$_3$ ester, benzenesulfonic acid, a lower alkyl, and an aryl.

Specific examples of the compound having an azobenzene structure may include azobenzene, 4-aminoazobenzene-4'-sulfonic acid, 4-(dimethylamino)-4'-(trifluoromethyl) azobenzene, C.I. Acid Red 13, Mercury Orange, 2',4'-diamino-5'-methylazobenzene-4-sodium sulfonate, methyl red, methyl yellow, methyl orange, azobenzene-2,4-diamine, alizarin yellow GG, 4-dimethylaminoazobenzene, Orange I, salazosulfapyridin, 4-(diethylamino)azobenzene, Orange OT, 3-methoxy-4-aminoazobenzene, 4-aminoazobenzene, N,N,-2-trimethylazobenzene-4-amine, 4-hydroxyazobenzene, Sudan I, 4-amino-3,5-dimethylazobenzene, N,N-dimethyl-4-[(quinolin-6-yl)azo]benzenamine, o-aminoazotoluene, alizarin yellow R, 4'-(aminosulfonyl)-4-hydroxyazobenzene-3-carboxylic acid, Congo red, Vital Red, Metanil Yellow, Orange II, Disperse Orange 3, C.I. Direct Orange 39, 2,2'-dihydroxyazobenzene, azobenzene-4,4'-diol, naphthyl red, 5-phenylazobenzene-2-ol, 2,2'-dimethylazobenzene, C.I. Mordant Yellow 12, Mordant Yellow 10, Acid Yellow, Disperse Blue, New Yellow RMF, and Bistramine Brown G.

(Compound Having Phenazine Structure and Azobenzene Structure)

A compound having a phenazine structure and an azobenzene structure can be represented by the following Formula (3). In the present embodiment, one kind or two or more kinds of compounds which have a phenazine structure and an azobenzene structure and are represented by the following Formula (3) can be contained as an additive.

[Chem. 9]

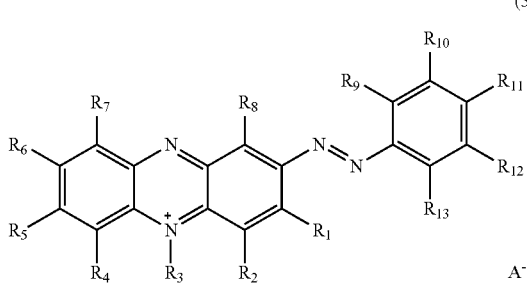

(3)

Here, in Formula (3), $R_1$, $R_2$, $R_4$, $R_5$, $R_6$, $R_7$, $R_8$, $R_9$, $R_{10}$, $R_{11}$, $R_{12}$, and $R_{13}$ are each independently a group selected from the group consisting of hydrogen, a halogen, amino, OH, =O, CN, SCN, SH, COOH, a COO salt, a COO ester, SO$_3$H, a SO$_3$ salt, a SO$_3$ ester, benzenesulfonic acid, and a C1 to C8 alkyl. In addition, $R_3$ is a group selected from the group consisting of hydrogen, a halogen, amino, OH, =O, CN, SCN, SH, COOH, a COO salt, a COO ester, SO$_3$H, a SO$_3$ salt, a SO$_3$ ester, benzenesulfonic acid, a lower alkyl, and an aryl. In addition, A$^-$ is a halide anion.

Specific examples of the compound having a phenazine structure and an azobenzene structure may include 3-(diethylamino)-7-[(4-hydroxyphenyl)azo]-2,8-dimethyl-5-phenylphenazin-5-ium, 3-[[4-(dimethylamino)phenyl]azo]-7-(diethylamino)-5-phenylphenazin-5-ium, Janus Green B, 3-amino-7-[(2,4-diaminophenyl)azo]-2,8-dimethyl-5-phenylphenazin-5-ium, 2,8-dimethyl-3-amino-5-phenyl-7-(2-hydroxy-1-naphthylazo)phenazin-5-ium, 3-[[4-(dimethylamino)phenyl]azo]-7-(dimethylamino)-5-phenylphenazin-5-ium, 3-amino-7-[[4-(dimethylamino)phenyl]azo]-5-phenylphenazin-5-ium, 2-(diethylamino)-7-[4-(methylpropargylamino)phenylazo]-9-phenyl-9-azonia-10-azaanthracene, 2-(diethylamino)-7-[4-(methyl 4-pentynylamino)phenylazo]-9-phenyl-9-azonia-10-azaanthracene, and 2-(diethylamino)-7-[4-(methyl 2,3-dihydroxypropylamino)phenylazo]-9-phenyl-9-azonia-10-azaanthracene.

(4) Surfactant

As a surfactant, a nonionic surfactant is contained. In the present embodiment, it is possible to produce a copper powder of which the growth in the vertical direction with respect to the flat plate-shaped surface is suppressed, namely, a copper powder having a smooth surface by adding a nonionic surfactant to the electrolytic solution together with the additives described above.

As the nonionic surfactant, one kind can be used singly or two or more kinds can be used concurrently, and the concentration of the nonionic surfactant in the electrolytic solution can be set to about from 1 to 10000 mg/L in total.

The number average molecular weight of the nonionic surfactant is not particularly limited, but it is preferably from 100 to 200000, more preferably from 200 to 15000, and still more preferably from 1000 to 10000. There is a possibility that a fine electrolytic copper powder which does not have a dendritic shape is precipitated when the surfactant has a number average molecular weight of less than 100. On the other hand, there is the possibility that an electrolytic copper powder having a large average particle diameter is precipitated and only dendritic copper powders having a specific surface area of less than 0.2 m$^2$/g are obtained when the surfactant has a number average molecular weight of more than 200,000. Incidentally, in the present embodiment, the number average molecular weight is defined as the molecular weight in terms of polystyrene determined by gel permeation chromatography (GPC) using tetrahydrofuran (THF) as a solvent.

The kind of the nonionic surfactant is not particularly limited, but it is preferably a surfactant having an ether group, and examples thereof may include polyethylene glycol, polypropylene glycol, polyethyleneimine, a Pluronic type surfactant, a Tetronic type surfactant, polyoxyethylene glycol.glycerin ether, polyoxyethylene glycol.dialkyl ether, polyoxyethylene polyoxypropylene glycol.alkyl ether, an aromatic alcohol alkoxylate, and a polymer compound represented by the following Formula (x), and these nonionic surfactants can be used singly or two or more kinds thereof can be used concurrently.

More specifically, for example, those represented by the following Formula (i) can be used as polyethylene glycol.

[Chem. 10]

$$(CH_2CH_2O)_{n1}- \quad (i)$$

(In Formula (i), n1 represents an integer from 1 to 120.)

In addition, for example, those represented by the following Formula (ii) can be used as polypropylene glycol.

[Chem. 11]

$$\begin{array}{c} CH_3 \\ | \\ -(CHCH_2O)_{n1}- \end{array} \quad (ii)$$

(In Formula (ii), n1 represents an integer from 1 to 90.)

In addition, for example, those represented by the following Formula (iii) can be used as polyethyleneimine.

[Chem. 12]

$$-(CH_2CH_2NH)_{n1}- \quad (iii)$$

(In Formula (iii), n1 represents an integer from 1 to 120.)

In addition, for example, those represented by the following Formula (iv) can be used as the Pluronic type surfactant.

[Chem. 13]

$$HO-(C_2H_4O)_{l2}-(C_3H_6O)_{m2}-(C_2H_4O)_{n2}-H \quad (iv)$$

(In Formula (iv), n2 and l2 represent an integer from 1 to 30 and m2 represents an integer from 10 to 100.)

In addition, for example, those represented by the following Formula (v) can be used as the Tetronic type surfactant.

[Chem. 14]

$$\begin{array}{c} H-(OH_4C_2)_{n3}-(OH_6C_3)_{m3} \diagdown \qquad \diagup (C_3H_6O)_{m3}-(C_2H_4O)_{n3}-H \\ N-CH_2-CH_2-N \\ H-(OH_4C_2)_{n3}-(OH_6C_3)_{m3} \diagup \qquad \diagdown (C_3H_6O)_{m3}-(C_2H_4O)_{n3}-H \end{array} \quad (v)$$

(In Formula (v), n3 represents an integer from 1 to 200 and m3 represents an integer from 1 to 40.)

In addition, for example, those represented by the following Formula (vi) can be used as polyoxyethylene glycol.glyceryl ether.

[Chem. 15]

$$H-(C_2H_4O)_{14}-O-CH \diagup \begin{array}{c} CH_2-O-(C_2H_4O)_{m4}-H \\ CH_2-O-(C_2H_4O)_{n4}-H \end{array} \quad (vi)$$

(In Formula (vi), n4, m4, and 14 each represent an integer from 1 to 200.)

In addition, for example, those represented by the following Formula (vii) can be used as polyoxyethylene glycol.dialkyl ether.

[Chem. 16]

$$R_1O-(C_2H_4O)_{n5}-OR_2 \quad (vii)$$

(In Formula (vii), R1 and R2 represent a hydrogen atom or a lower alkyl group having from 1 to 5 carbon atoms and n5 represents an integer from 2 to 200.)

In addition, for example, those represented by the following Formula (viii) can be used as polyoxyethylene polyoxypropylene glycol.alkyl ether.

[Chem. 17]

$$R_3O-(C_2H_4O)_{m6}(C_2H_4O)_{n6}-H \quad (viii)$$

(In Formula (viii), R3 represents a hydrogen atom or a lower alkyl group having from 1 to 5 carbon atoms and m6 or n6 represents an integer from 2 to 100.)

In addition, for example, those represented by the following Formula (ix) can be used as the aromatic alcohol alkoxylated.

[Chem. 18]

$$C_6H_5(CH_2)_{m7}O(CH_2CH_2O)_{n7}H \quad (ix)$$

(In Formula (ix), m7 represents an integer from 1 to 5 and n7 represents an integer from 1 to 120.)

In addition, a polymer compound represented by the following Formula (x) can be used.

[Chem. 19]

$$\begin{array}{c} R_2 \qquad R_3 \\ | \qquad | \\ R_1-(CH_2CHO)_m-(CH_2CHO)_n-H \end{array} \quad (x)$$

(In Formula (x), $R_1$ represents a residue of a higher alcohol having from 5 to 30 carbon atoms, a residue of an alkylphenol having an alkyl group having from 1 to 30 carbon atoms, a residue of an alkylnaphthol having an alkyl group having from 1 to 30 carbon atoms, a residue of a fatty acid amide having from 3 to 25 carbon atoms, a residue of an alkyl amine having from 2 to 5 carbon atoms, or a hydroxyl group. In addition, $R_2$ and $R_3$ represent a hydrogen atom or a methyl group. In addition, m and n represent an integer from 1 to 100.)

(5) Chloride Ion

The chloride ion can be contained in the electrolytic solution by adding a compound (chloride ion source) for supplying a chloride ion such as hydrochloric acid and sodium chloride to the electrolytic solution. The chloride ion contributes to the shape control of the copper powder to be precipitated together with the additive and nonionic surfactant described above. The concentration of chloride ion in the electrolytic solution is not particularly limited, but it can be set to about from 1 mg/L to 500 mg/L.

In the method for producing the dendritic copper powder 1 according to the present embodiment, for example, the dendritic copper powder is produced by precipitating and generating a copper powder on the cathode through electrolysis using the electrolytic solution having the composition as described above. A known method can be used as the electrolysis method. For example, the current density is preferably set to a range of from 3 A/dm$^2$ to 30 A/dm$^2$ upon electrolysis using an electrolytic solution exhibiting acidity by sulfuric acid, and an electric current is applied to the electrolytic solution being stirred. In addition, the liquid temperature (bath temperature) of the electrolytic solution can be set, for example, to about from 20° C. to 60° C.

<3-2. Coating Method of Silver (Production of Silver-Coated Copper Powder)>

The dendritic silver-coated copper powder 1 according to the present embodiment can be produced by coating the surface of the dendritic copper powder fabricated by the electrolysis method described above with silver by, for example, a reduction type electroless plating method or substitution type electroless plating method.

Particularly, in the dendritic silver-coated copper powder 1 according to the present embodiment, it is possible to more uniformly coat the surface of the copper powder with silver upon silver coating as the growth of the dendritic copper powder before being coated with silver in the vertical direction with respect to the flat plate-shaped surface is suppressed so as to have a smooth surface.

It is preferable to conduct washing before silver plating in order to coat the surface of the dendritic copper powder with silver in a uniform thickness, and it is possible to conduct washing while dispersing and stirring the dendritic copper powder in the washing liquid. This washing treatment is preferably conducted in an acidic solution, and it is more preferable to use a polycarboxylic acid which is also used as a reducing agent to be described later. After washing, filtration, separation, and water washing of the dendritic copper powder are appropriately repeated to obtain a water slurry in which the dendritic copper powder is dispersed in water. Incidentally, known methods may be used for the filtration, separation, and water washing.

Specifically, in the case of conducting silver coating by the reduction type electroless plating method, it is possible to coat the surface of the dendritic copper powder with silver by adding a reducing agent and a silver ion solution to the water slurry obtained after the dendritic copper powder is washed. Here, it is possible to more uniformly coat the surface of the dendritic copper powder with silver by adding and dispersing the reducing agent in the water slurry in advance and then continuously adding the silver ion solution to the water slurry containing the reducing agent and the dendritic copper powder.

Various reducing agents can be used as the reducing agent, but the reducing agent is preferably a reducing agent having a weak reducing power that cannot reduce a complex ion of copper. As the weak reducing agent, a reducing organic compound can be used, and for example, a carbohydrate, a polycarboxylic acid and a salt thereof, an aldehyde, and the like can be used. More specific examples thereof may include grape sugar (glucose), lactic acid, oxalic acid, tartaric acid, malic acid, malonic acid, glycolic acid, sodium potassium tartrate, and formalin.

After the reducing agent is added to the water slurry containing the dendritic copper powder, it is preferable to conduct stirring or the like in order to sufficiently disperse the reducing agent. In addition, it is possible to appropriately add an acid or an alkali in order to adjust the pH of the water slurry to a desired value. Furthermore, the dispersion of the reducing organic compound of a reducing agent may be accelerated by adding a water-soluble organic solvent such as an alcohol.

As the silver ion solution to be continuously added, those known as a silver plating solution can be used, but among them, it is preferable to use a silver nitrate solution. In addition, the silver nitrate solution is more preferably added as an ammoniacal silver nitrate solution since it is easy to form a complex. Incidentally, ammonia to be used in the ammoniacal silver nitrate solution may be added to the silver nitrate solution, added to and dispersed in the water slurry together with the reducing agent in advance, or simultaneously added to the water slurry as an ammonia solution different from the silver nitrate solution, or any method including a combination of these may be used.

It is preferable to gradually add the silver ion solution at a relatively slow rate upon addition of the silver ion solution to the water slurry containing, for example, the dendritic copper powder and the reducing agent, and this makes it possible to form a silver film having a uniform thickness on the surface of the dendritic copper powder. In addition, it is more preferable to keep the addition rate constant in order to increase the uniformity of the thickness of coating film. Furthermore, the reducing agent and the like that are added to the water slurry in advance may be prepared as a separate solution and gradually optionally added together with the silver ion solution.

In this manner, the dendritic silver-coated copper powder 1 can be obtained by filtering, separating, washing with water, and then drying the water slurry to which the silver ion solution and the like are added. The methods for these treatments from the filtration are not particularly limited, and known methods may be used.

Meanwhile, the method to coat silver by the substitution type electroless plating method utilizes the difference in ionization tendency between copper and silver, and the silver ions in the solution are reduced by the electrons generated when the copper is dissolved in the solution and silver thus obtained is precipitated on the copper surface in the method. Accordingly, it is possible to coat silver when the substitution type electroless silver plating solution is constituted by a silver salt as a silver ion source, a complexing agent, and a conductive salt as main components, but it is possible to add a surfactant, a brightener, a crystal modifier, a pH adjusting agent, a precipitation inhibitor, a stabilizer, and the like to the plating solution if necessary in order to more uniformly coat silver. The plating solution is not particularly limited in the production of the silver-coated copper powder according to the present embodiment as well.

More specifically, it is possible to use silver nitrate, silver iodide, silver sulfate, silver formate, silver acetate, silver lactate, and the like as the silver salt and it is possible to react the silver salt with the dendritic copper powder dispersed in the water slurry. The concentration of silver ion in the plating solution can be set to about from 1 g/L to 10 g/L.

In addition, the complexing agent forms a complex with the silver ion, and as a typical complexing agent, it is possible to use citric acid, tartaric acid, ethylenediaminetetraacetic acid, nitrilotriacetic acid, and the like or an N-containing compound such as ethylenediamine, glycine, hydantoin, pyrrolidone, or succinimide, hydroxyethylidene diphosphonic acid, aminotrimethylene phosphonic acid, mercaptopropionic acid, thioglycol, thiosemicarbazide, and the like. The concentration of the complexing agent in the plating solution can be set to about from 10 g/L to 100 g/L.

In addition, as the conductive salt, it is possible to use an inorganic acid such as nitric acid, boric acid, or phosphoric acid, an organic acid such as citric acid, maleic acid, tartaric acid, or phthalic acid, or sodium, potassium, and ammonium salts thereof, and the like. The concentration of the conductive salt in the plating solution can be set to about from 5 g/L to 50 g/L.

The coating amount when silver is coated on the surface of the dendritic copper powder can be controlled, for example, by changing the amount of silver input into the substitution type electroless plating solution. In addition, it is preferable to keep the addition rate constant in order to enhance the uniformity of thickness of coating film.

In this manner, a dendritic silver-coated copper powder can be obtained by filtering, separating, washing with water, and then drying the slurry of which the reaction is completed. The methods for these treatments from the filtration are not particularly limited, and known methods may be used.

<<4. Application of Electrically Conductive Paste, Electrically Conductive Coating Material for Electromagnetic Wave Shielding, and Electrically Conductive Sheet>>

The dendritic silver-coated copper powder 1 according to the present embodiment is a silver-coated copper powder having a dendritic shape having a main stem 2 and a plurality of branches 3, in which the main stem 2 and the plurality of branches 3 branched from the main stem 2 are constituted as copper particles which have a flat plate shape having a cross-sectional average thickness of from 0.02 µm to 5.0 µm and of which the surface is coated with silver gather as described above. In addition, the average particle diameter (D50) of the dendritic silver-coated copper powder is from 1.0 µm to 100 µm. Such a dendritic silver-coated copper powder 1 has a large surface area and exhibits excellent moldability and sinterability by having a dendritic shape, and the dendritic silver-coated copper powder 1 can secure a great number of contact points and exerts excellent electrical conductivity by having a dendritic shape and being constituted by copper particles having a flat plate shape having a predetermined cross-sectional average thickness.

Moreover, this dendritic silver-coated copper powder 1 is a copper powder of which the growth in the vertical direction is suppressed, which has a smooth surface, and in which the maximum height in the vertical direction with respect to the flat plate-shaped surface of the copper particles is 1/10 or less with respect to the maximum length in the horizontal direction of the flat plate-shaped surface of the copper particles. According to such a dendritic silver-coated copper powder 1, it is possible to further increase the number of contact points between the copper powders and to improve the electrical conductivity.

In addition, according to such a dendritic silver-coated copper powder 1 having a predetermined structure, it is possible to suppress the aggregation of the copper powder, to uniformly disperse the copper powder in the resin, and to suppress the occurrence of poor printability and the like due to an increase in viscosity of the paste even in the case of being formed into a copper paste and the like. Consequently, the dendritic silver-coated copper powder 1 can be suitably used in applications such as an electrically conductive paste and an electrically conductive coating material.

For example, an electrically conductive paste (copper paste) can be fabricated by kneading the dendritic copper powder 1 according to the present embodiment to be contained as a metal filler (copper powder) with a binder resin and a solvent and, if necessary, further with additives such as an antioxidant and a coupling agent.

In the present embodiment, the metal filler is constituted so that the amount proportion of the dendritic silver-coated copper powder 1 described above therein is 20% by mass or more, preferably 30% by mass or more, and more preferably 50% by mass or more. When the proportion of the dendritic silver-coated copper powder 1 in the metal filler is set to 20% by mass or more, it is possible to uniformly disperse the metal filler in the resin and to prevent poor printability due to an excessive increase in viscosity of the paste, for example, in the case of using this metal filler in a copper paste. In addition, it is possible to exert excellent electrical conductivity as an electrically conductive paste by being the dendritic silver-coated copper powder 1 composed of an assembly of fine copper particles having a flat plate shape.

Incidentally, for example, a spherical copper powder having a size of about from 1 µm to 20 µm and the like may be mixed in the metal filler as other components as long as the metal filler contains the dendritic silver-coated copper powder 1 in an amount proportion of 20% by mass or more as described above.

Specifically, the binder resin is not particularly limited, but an epoxy resin, a phenol resin, and the like can be used. In addition, as the solvent, organic solvents such as ethylene glycol, diethylene glycol, triethylene glycol, glycerin, and terpineol can be used. In addition, the amount of the organic solvent added is not particularly limited, but the amount can be adjusted in consideration of the particle size of the dendritic silver-coated copper powder 1 so as to have a viscosity suitable for an electrically conductive film forming method by screen printing or a dispenser.

Furthermore, other resin components can also be added in order to adjust the viscosity. Examples thereof may include a cellulose-based resin typified by ethyl cellulose, and it is added as an organic vehicle dissolved in an organic solvent such as terpineol. Incidentally, the amount of the resin component added is required to be suppressed to an extent to which the sinterability is not inhibited, and it is preferably set to 5% by mass or less of the total mass.

In addition, as an additive, an antioxidant and the like can be added in order to improve the electrical conductivity after calcination. The antioxidant is not particularly limited, but examples thereof may include a hydroxycarboxylic acid. More specifically, hydroxycarboxylic acids such as citric acid, malic acid, tartaric acid, and lactic acid are preferable, and citric acid or malic acid exhibiting high adsorptive power to copper coated with silver is particularly preferable. The amount of antioxidant added can be set to, for example, about from 1 to 15% by mass in consideration of the antioxidant effect, the viscosity of the paste, and the like.

Next, in the case of utilizing the dendritic silver-coated copper powder 1 according to the present embodiment as a metal filler in a material for electromagnetic wave shielding as well, the metal filler is not limited to use under particularly limited conditions but can be used by a general method, for example, by being mixed with a resin.

For example, the resin to be used in order to form the electromagnetic wave shielding layer of an electrically conductive sheet for electromagnetic wave shielding is not particularly limited, and it is possible to appropriately use a thermoplastic resin, a thermosetting resin, a radiation-curing resin, and the like that have been conventionally used and are composed of various kinds of polymers and copolymers such as a vinyl chloride resin, a vinyl acetate resin, a vinylidene chloride resin, an acrylic resin, a polyurethane resin, a polyester resin, an olefin resin, a chlorinated olefin resin, a polyvinyl alcohol-based resin, an alkyd resin, and a phenol resin.

As the method for producing the electromagnetic wave shielding material, for example, the electromagnetic wave shielding material can be produced by applying or printing a coating material in which a metal filler and a resin as described above are dispersed or dissolved in a solvent on a substrate to form an electromagnetic wave shielding layer and drying the coating material to an extent to which the surface is solidified. In addition, it is also possible to utilize the metal filler in the electrically conductive adhesive layer of an electrically conductive sheet.

In addition, in the case of utilizing the silver-coated copper powder 1 according to the present embodiment as a metal filler to form an electrically conductive coating material for electromagnetic wave shielding as well, the metal filler is not limited to use under particularly limited conditions but can be used as an electrically conductive coating material by a general method, for example, by being mixed with a resin and a solvent and, if necessary, further with an antioxidant, a thickener, an anti-settling agent, and the like and kneaded together.

The binder resin and solvent to be used at this time are not particularly limited, and it is possible to utilize a vinyl chloride resin, a vinyl acetate resin, an acrylic resin, a polyester resin, a fluorocarbon resin, a silicone resin, a phenol resin, and the like that have been conventionally used. In addition, with regard to the solvent as well, it is possible to utilize an alcohol such as isopropanol, an aromatic hydrocarbon such as toluene, an ester such as methyl acetate, a ketone such as methyl ethyl ketone, and the like that have been conventionally used. In addition, with regard to the antioxidant as an additive as well, it is possible to utilize a fatty acid amide, a higher fatty acid amine, a phenylenediamine derivative, a titanate-based coupling agent, and the like that have been conventionally used.

EXAMPLES

Hereinafter, the present invention will be described more specifically with reference to Examples together with Comparative Examples, but the present invention is not limited to the following Examples at all.
<Evaluation Method>
The copper powders obtained in the following Examples and Comparative Examples were subjected to the observation of shape, the measurement of average particle diameter, the measurement of the specific surface area and the like by the following methods.
(Observation of Shape)
The silver-coated copper powder contained in 20 arbitrary fields of vision in a field of vision at a predetermined magnification was observed through a scanning electron microscope (SEM) (model: JSM-7100F manufactured by JEOL Ltd.).
(Measurement of Average Particle Diameter)
The average particle diameter (D50) of the silver-coated copper powder obtained was measured by using a laser diffraction/scattering method particle size distribution measuring instrument (HRA9320 X-100 manufactured by NIKKISO CO., LTD.).
(BET Specific Surface Area)
The BET specific surface area was measured by using a specific surface area and pore distribution measuring apparatus (QUADRASORB SI manufactured by Quantachrome Instruments).
(Measurement of Specific Resistance Value)
The specific resistance value of the coating film was determined by measuring the sheet resistance value by a four-terminal method using a low resistivity meter (Loresta-GP MCP-T600 manufactured by Mitsubishi Chemical Corporation) and the film thickness of the coating film by using a surface roughness and shape measuring instrument (SURFCOM 130A manufactured by TOKYO SEIMITSU CO., LTD.) and dividing the sheet resistance value by the film thickness.
(Electromagnetic Wave Shielding Property)
The evaluation on the electromagnetic wave shielding property was carried out by measuring the attenuation factor of the samples obtained in the respective Examples and Comparative Examples by using an electromagnetic wave having a frequency of 1 GHz. Specifically, the level in the case of Comparative Example 2 in which a dendritic silver-coated copper powder was not used was evaluated as "Δ", a case in which the attenuation factor was worse than the level of Comparative Example 2 was evaluated as "x", a case in which the attenuation factor was more favorable than the level of Comparative Example 2 was evaluated as "○", and a case in which the attenuation factor was superior to the level of Comparative Example 2 was evaluated as "⊙".

In addition, it was confirmed whether the electromagnetic wave shielding property changed or not by bending the fabricated electromagnetic wave shield in order to evaluate the flexibility of the electromagnetic wave shield.

Example 1

<Production of Dendritic Copper Powder>
A titanium electrode plate having an electrode area of 200 mm×200 mm and a copper electrode plate having an electrode area of 200 mm×200 mm were installed in an electrolytic cell having a capacity of 100 L as the cathode and the anode, respectively, an electrolytic solution was put into the electrolytic cell, and a direct current was applied to this, thereby precipitating a copper powder on the cathode plate.

At this time, a solution having composition in which the concentration of copper ion was 15 g/L and the concentration of sulfuric acid was 100 g/L was used as the electrolytic solution. In addition, a hydrochloric acid solution (manufactured by Wako Pure Chemical Industries, Ltd.) was added to this electrolytic solution so that the concentration of chloride ion (chlorine ion) in the electrolytic solution was 50 mg/L. In addition, safranin (manufactured by KANTO CHEMICAL CO., INC.) of a compound having a phenazine structure was added to this electrolytic solution as an additive so as to have a concentration of 100 mg/L in the electrolytic solution, and further, polyethylene glycol (PEG) (manufactured by Wako Pure Chemical Industries, Ltd.) having a molecular weight of 1000 of a nonionic surfactant was added to this electrolytic solution so as to have a concentration of 500 mg/L in the electrolytic solution.

Thereafter, an electric current was applied to the electrolytic solution having a concentration adjusted as described above so that the current density of the cathode was 10 A/dm$^2$ while circulating the electrolytic solution at a flow rate of 15 L/min by using a metering pump and maintaining the temperature at 25° C., thereby precipitating a copper powder on the cathode plate.

The electrolytic copper powder precipitated on the cathode plate was mechanically scraped off to the cell bottom of the electrolytic cell by using a scraper and recovered, and the copper powder thus recovered was washed with pure water, then placed in a vacuum dryer, and dried.
<Production of Dendritic Silver-Coated Copper Powder by Reduction Method>
Next, a silver-coated copper powder was fabricated by using the copper powder fabricated by the method described above.

In other words, 100 g of the copper powder thus obtained was stirred in a 3% aqueous solution of tartaric acid for about 1 hour, then filtered, washed with water, and dispersed in 2 liters of ion exchanged water. To this, 6 g of tartaric acid, 6 g of glucose, and 60 ml of ethanol were added, 60 ml of 28% ammonia water was further added thereto and stirred, thereafter, an aqueous solution prepared by dissolving 70 g of silver nitrate in 4.5 liters of ion exchanged water, an aqueous solution prepared by dissolving 30 g of glucose, 30 g of tartaric acid, and 300 ml of ethanol in 900 ml of ion exchanged water, and 300 ml of 28% ammonia water were gradually added to the mixture over 60 minutes, respectively. Incidentally, the bath temperature at this time was 25° C.

After the addition of each aqueous solution was completed, the powder was filtered, washed with water, and dried over ethanol, thereby obtaining a silver-coated copper powder in which the surface of the copper powder was coated with silver. The silver-coated copper powder thus obtained was observed through an SEM in a field of vision at 5,000-times magnification, and as a result, at least 90% by number or more of the silver-coated copper powders was a dendritic silver-coated copper powder which had a dendritic shape and in which flat plate-shaped copper particles having the surface uniformly coated with silver densely gathered. In addition, the dendritic silver-coated copper powder was recovered and the amount of silver coated was measured to have a result of 30.5% by mass with respect to 100% by mass of the entire silver-coated copper powder.

In addition, while observing the dendritic silver-coated copper powder thus obtained through a SEM, the cross-sectional average thickness of the flat plate-shaped copper particles and the ratio of the maximum length grown in the vertical direction with respect to the flat plate-shaped surface of the dendritic silver-coated copper powder to the length of major axis in the horizontal direction with respect to the flat plate-shaped surface were measured. As a result, the copper particles constituting the dendritic silver-coated copper powder thus obtained had a flat plate shape having a cross-sectional average thickness of 2.6 µm. In addition, the average particle diameter (D50) of the dendritic silver-coated copper powder was 47.7 µm. Moreover, the ratio (length in vertical direction/length of major axis in flat plate direction) of the maximum length grown in the vertical direction from the flat plate-shaped surface of the silver-coated copper powder to the maximum length in the horizontal direction (flat plate direction) with respect to the flat plate-shaped surface was 0.062 on average.

In addition, the bulk density of the dendritic silver-coated copper powder thus obtained was 2.9 g/cm$^3$. In addition, the BET specific surface area thereof was 1.13 m$^2$/g.

From these results of Example 1, it has been found that it is possible to fabricate a dendritic silver-coated copper powder of which the growth in the vertical direction is suppressed and which thus has a flat plate shape by fabricating a dendritic electrolytic copper powder by adding a compound having a phenazine structure and a nonionic surfactant to the electrolytic solution and coating the surface of the copper powder thus obtained with silver.

Example 2

<Production of Dendritic Copper Powder>

A hydrochloric acid solution (manufactured by Wako Pure Chemical Industries, Ltd.) was added to the electrolytic solution so that the concentration of chloride ion was 150 mg/L in the electrolytic solution, and methyl orange (manufactured by KANTO CHEMICAL CO., INC.) of a compound having an azobenzene structure was added to the electrolytic solution as an additive so as to have a concentration of 150 mg/L in the electrolytic solution. Furthermore, polyoxyethylene polyoxypropylene butyl ether (trade name: UNILUBE 50 MB-11 manufactured by NOF CORPORATION) having a molecular weight of 1000 of a nonionic surfactant was added to the electrolytic solution so as to have a concentration of 700 mg/L in the electrolytic solution. A dendritic copper powder was fabricated by conducting the electrolytic treatment under the same conditions as in Example 1 other than these.

<Production of Dendritic Silver-Coated Copper Powder by Reduction Method>

Next, the surface of the dendritic copper powder thus obtained was coated with silver according to the same procedure as in Example 1, thereby obtaining a silver-coated copper powder in which the surface of the dendritic copper powder was coated with silver.

The silver-coated copper powder thus obtained was observed through an SEM in a field of vision at 5,000-times magnification, and as a result, at least 90% by number or more of the silver-coated copper powders was a dendritic silver-coated copper powder which had a dendritic shape and in which flat plate-shaped copper particles having the surface uniformly coated with silver densely gathered. In addition, the dendritic silver-coated copper powder was recovered and the amount of silver coated was measured to have a result of 30.1% by mass with respect to 100% by mass of the entire silver-coated copper powder.

In addition, while observing the dendritic silver-coated copper powder thus obtained through a SEM, the cross-sectional average thickness of the flat plate-shaped copper particles and the ratio of the maximum length grown in the vertical direction with respect to the flat plate-shaped surface of the dendritic silver-coated copper powder to the length of major axis in the horizontal direction with respect to the flat plate-shaped surface were measured. As a result, the copper particles constituting the dendritic silver-coated copper powder thus obtained had a flat plate shape having a cross-sectional average thickness of 1.8 µm. In addition, the average particle diameter (D50) of the dendritic silver-coated copper powder was 36.6 µm. Moreover, the ratio (length in vertical direction/length of major axis in flat plate direction) of the maximum length grown in the vertical direction from the flat plate-shaped surface of the silver-coated copper powder to the maximum length in the horizontal direction (flat plate direction) with respect to the flat plate-shaped surface was 0.036 on average.

In addition, the bulk density of the dendritic silver-coated copper powder thus obtained was 2.2 g/cm$^3$. In addition, the BET specific surface area thereof was 1.24 m$^2$/g.

From these results of Example 2, it has been found that it is possible to fabricate a dendritic silver-coated copper powder of which the growth in the vertical direction is suppressed and which thus has a flat plate shape by fabricating a dendritic electrolytic copper powder by adding a compound having an azobenzene structure and a nonionic surfactant to the electrolytic solution and coating the surface of the copper powder thus obtained with silver.

Example 3

<Production of Dendritic Copper Powder>

A hydrochloric acid solution (manufactured by Wako Pure Chemical Industries, Ltd.) was added to the electrolytic solution so that the concentration of chloride ion was 80 mg/L in the electrolytic solution, and Janus Green B (manufactured by KANTO CHEMICAL CO., INC.) of a compound having a phenazine structure and an azobenzene structure was added to the electrolytic solution as an additive so as to have a concentration of 600 mg/L in the electrolytic solution. Furthermore, polyoxyethylene polyoxypropylene butyl ether (trade name: UNILUB 50 MB-72, manufactured by NOF CORPORATION) having a molecular weight of 3000 of a nonionic surfactant was added to the electrolytic solution so as to have a concentration of 1000 mg/L in the electrolytic solution. A dendritic copper powder was fabricated by conducting the electrolytic treatment under the same conditions as in Example 1 other than these.

<Fabrication of Dendritic Silver-Coated Copper Powder by Substitution Method>

Next, the surface of the copper powder was coated with silver by using 100 g of the dendritic copper powder thus obtained and a substitution type electroless plating solution. As the substitution type electroless plating solution, a solution having composition obtained by dissolving 25 g of silver nitrate, 20 g of citric acid, and 10 g of ethylenediamine in 1 liter of ion exchanged water was used, and 100 g of dendritic copper powder was put into the solution and reacted by being stirred for 45 minutes. The bath temperature at this time was 30° C.

After the reaction was completed, the powder was filtered, washed with water, and dried over ethanol, thereby obtaining a silver-coated copper powder in which the surface of the dendritic copper powder was coated with silver. The silver-coated copper powder thus obtained was observed through an SEM in a field of vision at 5,000-times magnification, and as a result, at least 90% by number or more of the silver-coated copper powders was a dendritic silver-coated copper powder which had a dendritic shape and in which flat plate-shaped copper particles having the surface uniformly coated with silver densely gathered. In addition, the dendritic silver-coated copper powder was recovered and the amount of silver coated was measured to have a result of 10.6% by mass with respect to 100% by mass of the entire silver-coated copper powder.

In addition, while observing the dendritic silver-coated copper powder thus obtained through a SEM, the cross-sectional average thickness of the flat plate-shaped copper particles and the ratio of the maximum length grown in the vertical direction with respect to the flat plate-shaped surface of the dendritic silver-coated copper powder to the length of major axis in the horizontal direction with respect to the flat plate-shaped surface were measured. As a result, the copper particles constituting the dendritic silver-coated copper powder thus obtained had a flat plate shape having a cross-sectional average thickness of 1.2 µm. In addition, the average particle diameter (D50) of the dendritic silver-coated copper powder was 32.9 µm. Moreover, the ratio (length in vertical direction/length of major axis in flat plate direction) of the maximum length grown in the vertical direction from the flat plate-shaped surface of the silver-coated copper powder to the maximum length in the horizontal direction (flat plate direction) with respect to the flat plate-shaped surface was 0.024 on average.

In addition, the bulk density of the dendritic silver-coated copper powder thus obtained was 1.9 g/cm$^3$. In addition, the BET specific surface area thereof was 1.89 m$^2$/g.

From these results of Example 3, it has been found that it is possible to fabricate a dendritic silver-coated copper powder of which the growth in the vertical direction is suppressed and which thus has a flat plate shape by fabricating a dendritic electrolytic copper powder by adding a compound having a phenazine structure and an azobenzene structure and a nonionic surfactant to the electrolytic solution and coating the surface of the copper powder thus obtained with silver.

Example 4

<Production of Dendritic Copper Powder>

A hydrochloric acid solution (manufactured by Wako Pure Chemical Industries, Ltd.) was added to the electrolytic solution so that the concentration of chloride ion was 100 mg/L in the electrolytic solution, methyl orange (manufactured by KANTO CHEMICAL CO., INC.) of a compound having an azobenzene structure was added to the electrolytic solution as an additive so as to have a concentration of 150 mg/L in the electrolytic solution, and further Janus Green B (manufactured by KANTO CHEMICAL CO., INC.) of a compound having a phenazine structure and an azobenzene structure was added to the electrolytic solution as an additive so as to have a concentration of 100 mg/L in the electrolytic solution. In addition, polyethylene glycol (PEG) (manufactured by Wako Pure Chemical Industries, Ltd.) having a molecular weight of 600 of a nonionic surfactant was added to the electrolytic solution so as to have a concentration of 1000 mg/L in the electrolytic solution, further polyoxyethylene polyoxypropylene butyl ether (trade name: UNILUB 50 MB-72, manufactured by NOF CORPORATION) having a molecular weight of 3000 of a nonionic surfactant was added to the electrolytic solution so as to have a concentration of 1000 mg/L in the electrolytic solution, and a dendritic copper powder was fabricated by conducting the electrolytic treatment under the same conditions as in Example 1 other than these.

<Production of Dendritic Silver-Coated Copper Powder by Reduction Method>

Next, the surface of the dendritic copper powder thus obtained was coated with silver according to the same procedure as in Example 1, thereby obtaining a silver-coated copper powder in which the surface of the dendritic copper powder was coated with silver.

The silver-coated copper powder thus obtained was observed through an SEM in a field of vision at 5,000-times magnification, and as a result, at least 90% by number or more of the silver-coated copper powders was a dendritic silver-coated copper powder which had a dendritic shape and in which flat plate-shaped copper particles having the surface uniformly coated with silver densely gathered. In addition, the dendritic silver-coated copper powder was recovered and the amount of silver coated was measured to have a result of 30.8% by mass with respect to 100% by mass of the entire silver-coated copper powder.

In addition, while observing the dendritic silver-coated copper powder thus obtained through a SEM, the cross-sectional average thickness of the flat plate-shaped copper particles and the ratio of the maximum length grown in the vertical direction with respect to the flat plate-shaped surface of the dendritic silver-coated copper powder to the length of major axis in the horizontal direction with respect to the flat plate-shaped surface were measured. As a result, the copper particles constituting the dendritic silver-coated copper powder thus obtained had a flat plate shape having a cross-sectional average thickness of 0.4 µm. In addition, the average particle diameter (D50) of the dendritic silver-coated copper powder was 18.5 µm. Moreover, the ratio (length in vertical direction/length of major axis in flat plate direction) of the maximum length grown in the vertical direction from the flat plate-shaped surface of the silver-coated copper powder to the maximum length in the horizontal direction (flat plate direction) with respect to the flat plate-shaped surface was 0.056 on average.

In addition, the bulk density of the dendritic silver-coated copper powder thus obtained was 1.1 g/cm$^3$. In addition, the BET specific surface area thereof was 2.16 m$^2$/g.

From these results of Example 4, it has been found that it is possible to fabricate a dendritic silver-coated copper powder of which the growth in the vertical direction is suppressed and which thus has a flat plate shape by fabricating a dendritic electrolytic copper powder by adding a compound having an azobenzene structure and a compound having a phenazine structure and an azobenzene structure as additives in mixture and two or more kinds of nonionic surfactants to the electrolytic solution and coating the surface of the copper powder thus obtained with silver.

Example 5

With 55 parts by mass of the dendritic silver-coated copper powder which had a specific surface area of 1.13 m$^2$/g and was obtained in Example 1, 15 parts by mass of a phenol resin (PL-2211 manufactured by Gunei Chemical Industry Co., Ltd.) and 10 parts by mass of butyl cellosolve (KANTO CHEMICAL CO., INC. Cica Special Grade), were mixed and the mixture was repeatedly kneaded by using a small kneader (Non-bubbling Kneader NBK-1 manufactured by NIHONSEIKI KAISHA LTD.) at 1200 rpm for 3 minutes three times to be formed into a paste. The electrically conductive paste thus obtained was printed on glass by using a metal squeegee and cured for 30 minutes at temperatures of 150° C. and 200° C. in the air atmosphere, respectively.

The specific resistance value of the coating film obtained by curing was 26.5×10$^{-6}$ Ω·cm (curing temperature: 150° C.) and 3.6×10$^{-6}$ Ω·cm (curing temperature: 200° C.), respectively.

Example 6

With 55 parts by mass of the dendritic silver-coated copper powder which had a specific surface area of 1.24 m$^2$/g and was obtained in Example 2, 15 parts by mass of a phenol resin (PL-2211 manufactured by Gunei Chemical Industry Co., Ltd.) and 10 parts by mass of butyl cellosolve (KANTO CHEMICAL CO., INC. Cica Special Grade), were mixed and the mixture was repeatedly kneaded by using a small kneader (Non-bubbling Kneader NBK-1 manufactured by NIHONSEIKI KAISHA LTD.) at 1200 rpm for 3 minutes three times to be formed into a paste. The electrically conductive paste thus obtained was printed on glass by using a metal squeegee and cured for 30 minutes at temperatures of 150° C. and 200° C. in the air atmosphere, respectively.

The specific resistance value of the coating film obtained by curing was 28.3×10$^{-6}$ Ω·cm (curing temperature: 150° C.) and 4.4×10$^{-6}$ Ω·cm (curing temperature: 200° C.), respectively.

Example 7

With 55 parts by mass of the dendritic silver-coated copper powder which had a specific surface area of 2.16 m$^2$/g and was obtained in Example 4, 15 parts by mass of a phenol resin (PL-2211 manufactured by Gunei Chemical Industry Co., Ltd.) and 10 parts by mass of butyl cellosolve (KANTO CHEMICAL CO., INC. Cica Special Grade), were mixed and the mixture was repeatedly kneaded by using a small kneader (Non-bubbling Kneader NBK-1 manufactured by NIHONSEIKI KAISHA LTD.) at 1200 rpm for 3 minutes three times to be formed into a paste. The electrically conductive paste thus obtained was printed on glass by using a metal squeegee and cured for 30 minutes at temperatures of 150° C. and 200° C. in the air atmosphere, respectively.

The specific resistance value of the coating film obtained by curing was 31.2×10$^{-6}$ Ω·cm (curing temperature: 150° C.) and 4.9×10$^{-6}$ Ω·cm (curing temperature: 200° C.), respectively.

Example 8

With 55 parts by mass (total amount) of silver-coated copper powder in which two different kinds of silver-coated copper powders of the silver-coated copper powder which had a specific surface area of 1.13 m$^2$/g and was obtained in Example 1 and the silver-coated copper powder which had a specific surface area of 1.24 m$^2$/g and was obtained in Example 2 were mixed at a proportion of 50:50, 15 parts by mass of a phenol resin (PL-2211 manufactured by Gunei Chemical Industry Co., Ltd.) and 10 parts by mass of butyl cellosolve (KANTO CHEMICAL CO., INC. Cica Special Grade), were mixed and the mixture was repeatedly kneaded by using a small kneader (Non-bubbling Kneader NBK-1 manufactured by NIHONSEIKI KAISHA LTD.) at 1200 rpm for 3 minutes three times to be formed into a paste. The electrically conductive paste thus obtained was printed on glass by using a metal squeegee and cured for 30 minutes at temperatures of 150° C. and 200° C. in the air atmosphere, respectively.

The specific resistance value of the coating film obtained by curing was 28.9×10$^{-6}$ Ω·cm (curing temperature: 150° C.) and 3.1×10$^{-6}$ Ω·cm (curing temperature: 200° C.), respectively.

Example 9

The dendritic silver-coated copper powder which had a specific surface area of 1.13 m$^2$/g and was obtained in Example 1 was dispersed in a resin to prepare an electromagnetic wave shielding material.

In other words, 100 g of a vinyl chloride resin and 200 g of methyl ethyl ketone were respectively mixed with 40 g of the dendritic silver-coated copper powder obtained in Example 1 and the mixture was repeatedly kneaded by using a small kneader at 1200 rpm for 3 minutes three times to be formed into a paste. When forming a paste, the silver-coated copper powder was uniformly dispersed in the resin without aggregating. This was applied on a substrate formed of a transparent polyethylene terephthalate sheet having a thickness of 100 μm by using a Mayer bar and dried to form an electromagnetic wave shielding layer having a thickness of 25 μm.

The electromagnetic wave shielding property was evaluated by measuring the attenuation factor by using an electromagnetic wave having a frequency of 1 GHz. The evaluation results on the properties are presented in Table 1.

Example 10

The dendritic silver-coated copper powder which had a specific surface area of 1.24 m$^2$/g and was obtained in Example 2 was dispersed in a resin to prepare an electromagnetic wave shielding material.

In other words, 100 g of a vinyl chloride resin and 200 g of methyl ethyl ketone were respectively mixed with 40 g of the dendritic silver-coated copper powder obtained in Example 2 and the mixture was repeatedly kneaded by using a small kneader at 1200 rpm for 3 minutes three times to be formed into a paste. When forming a paste, the silver-coated copper powder was uniformly dispersed in the resin without aggregating. This was applied on a substrate formed of a transparent polyethylene terephthalate sheet having a thickness of 100 μm by using a Mayer bar and dried to form an electromagnetic wave shielding layer having a thickness of 25 μm.

The electromagnetic wave shielding property was evaluated by measuring the attenuation factor by using an electromagnetic wave having a frequency of 1 GHz. The evaluation results on the properties are presented in Table 1.

Example 11

The dendritic silver-coated copper powder which had a specific surface area of 2.16 m²/g and was obtained in Example 4 was dispersed in a resin to prepare an electromagnetic wave shielding material.

In other words, 100 g of a vinyl chloride resin and 200 g of methyl ethyl ketone were respectively mixed with 40 g of the dendritic silver-coated copper powder obtained in Example 4 and the mixture was repeatedly kneaded by using a small kneader at 1200 rpm for 3 minutes three times to be formed into a paste. When forming a paste, the silver-coated copper powder was uniformly dispersed in the resin without aggregating. This was applied on a substrate formed of a transparent polyethylene terephthalate sheet having a thickness of 100 μm by using a Mayer bar and dried to form an electromagnetic wave shielding layer having a thickness of 25 μm.

The electromagnetic wave shielding property was evaluated by measuring the attenuation factor by using an electromagnetic wave having a frequency of 1 GHz. The evaluation results on the properties are presented in Table 1.

Comparative Example 1

A copper powder was precipitated on the cathode plate under the same conditions except that safranin of a compound having a phenazine structure as an additive and polyethylene glycol (PEG) having a molecular weight of 1000 of a nonionic surfactant were not added to the electrolytic solution in the conditions of Example 1. Subsequently, the surface of the copper powder thus obtained was coated with silver under the same conditions as in Example 1 to obtain a silver-coated copper powder.

The shape of the silver-coated copper powder thus obtained was observed by the method through a SEM described above, and as a result, the silver-coated copper powder thus obtained had a dendritic shape, but it was formed as granular copper particles gathered and was not a dendritic silver-coated copper powder having a flat plate shape. In addition, the specific surface area of the silver-coated copper powder thus obtained was 0.14 m²/g, and the amount of silver coated was 30.4% by mass with respect to 100% by mass of the entire silver-coated copper powder.

Next, 15 parts by mass of a phenol resin (PL-2211 manufactured by Gunei Chemical Industry Co., Ltd.) and 10 parts by mass of butyl cellosolve (KANTO CHEMICAL CO., INC. Cica Special Grade), were mixed with 55 parts by mass of the dendritic silver-coated copper powder thus fabricated and the mixture was repeatedly kneaded by using a small kneader (Non-bubbling Kneader NBK-1 manufactured by NIHONSEIKI KAISHA LTD.) at 1200 rpm for 3 minutes three times to be formed into a paste. The electrically conductive paste thus obtained was printed on glass by using a metal squeegee and cured for 30 minutes at temperatures of 150° C. and 200° C. in the air atmosphere, respectively.

The specific resistance value of the coating film obtained by curing was 165×10⁻⁶ Ω·cm (curing temperature: 150° C.) and 45.2×10⁻⁶ Ω·cm (curing temperature: 200° C.), respectively.

Comparative Example 2

The silver-coated copper powder obtained in Comparative Example 1 was dispersed in a resin to prepare an electromagnetic wave shielding material.

In other words, 100 g of a vinyl chloride resin and 200 g of methyl ethyl ketone were respectively mixed with 40 g of the dendritic silver-coated copper powder obtained in Comparative Example 1 set to the conditions in which safranin and a nonionic surfactant as an additive were desired to be not added in Example 1, and the mixture was repeatedly kneaded by using a small kneader at 1200 rpm for 3 minutes three times to be formed into a paste. When forming a paste, the silver-coated copper powder was uniformly dispersed in the resin without aggregating. This was applied on a substrate formed of a transparent polyethylene terephthalate sheet having a thickness of 100 μm by using a Mayer bar and dried to form an electromagnetic wave shielding layer having a thickness of 25 μm.

The electromagnetic wave shielding property was evaluated by measuring the attenuation factor by using an electromagnetic wave having a frequency of 1 GHz. The evaluation results on the properties are presented in Table 1.

TABLE 1

| | Dendritic copper powder | | | Properties of electrically conductive paste [×10⁻⁶ Ωcm] | | Properties of electromagnetic wave shield | |
|---|---|---|---|---|---|---|---|
| | [1] Specific surface area [m²/g] | [2] Specific surface area [m²/g] | Mixing rate [%] ([1]/[2]) | 150° C. | 200° C. | Plane | Bending |
| Example 5 | 1.13 | — | 100/0 | 26.5 | 3.6 | — | — |
| Example 6 | 1.24 | — | 100/0 | 28.3 | 4.4 | — | — |
| Example 7 | 2.16 | — | 100/0 | 31.2 | 4.9 | — | — |
| Example 8 | 1.13 | 1.24 | 50/50 | 28.9 | 3.1 | — | — |
| Example 9 | 1.13 | — | 100/0 | — | — | ⊚ | ○ |
| Example 10 | 1.24 | — | 100/0 | — | — | ⊚ | ○ |
| Example 11 | 2.16 | — | 100/0 | — | — | ⊚ | ○ |
| Comparative Example 1 | 0.14 | — | 100/0 | 167 | 45.2 | — | — |
| Comparative Example 2 | 0.14 | — | 100/0 | — | — | Δ | X |

EXPLANATION OF REFERENCE NUMERALS 1 (Dendritic) silver-coated copper powder
2 Main stem
3, 3a, 3b Branch
4 Maximum length in horizontal direction (X-Y direction) with respect to flat plate-shaped surface
5 Maximum height in vertical direction with respect to flat plate-shaped surface (X-Y surface)

The invention claimed is:

1. A silver-coated copper powder having a dendritic shape having a linearly grown main stem and a plurality of branches separated from the main stem, wherein
   the main stem and the branches are constituted as flat plate-shaped copper particles having a cross-sectional average thickness of from 0.02 μm to 5.0 μm to be determined by scanning electron microscopic (SEM) observation gather,
   a surface of the copper particles is coated with silver,
   an average particle diameter (D50) of the silver-coated copper powder is from 1.0 μm to 100 μm, and
   a maximum height in a vertical direction with respect to a flat plate-shaped surface of the copper particles is 1/10 or less with respect to a maximum length in a horizontal direction of the flat plate-shaped surface.

2. The silver-coated copper powder according to claim 1, wherein an amount of silver coated is from 1% by mass to 50% by mass with respect to 100% by mass of the entire silver-coated copper powder coated with silver.

3. The silver-coated copper powder according to claim 2, wherein a bulk density of the silver-coated copper powder is in a range of from 0.5 g/cm³ to 5.0 g/cm³.

4. The silver-coated copper powder according to claim 2, wherein a BET specific surface area value of the silver-coated copper powder is from 0.2 m²/g to 5.0 m²/g.

5. A metal filler comprising the silver-coated copper powder according to claim 2 at a proportion of 20% by mass or more of the entire metal filler.

6. A method for producing the silver-coated copper powder according to claim 2, the method comprising:
   a step of precipitating a copper powder from an electrolytic solution on a cathode by an electrolytic method; and
   a step of coating the copper powder with silver, wherein electrolysis is conducted by using the electrolytic solution containing
   a copper ion,
   one or more kinds of compounds which have a phenazine structure and are represented by the following Formula (1), and
   one or more kinds of nonionic surfactants:

[Chem. 1]

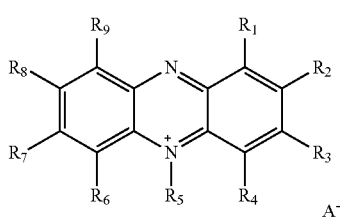

(1)

[in Formula (1), $R_1$, $R_2$, $R_3$, $R_4$, $R_6$, $R_7$, $R_8$, and $R_9$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_5$ is a group selected from the group consisting of hydrogen, a halogen, amino, OH, —O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion].

7. A method for producing the silver-coated copper powder according to claim 2, the method comprising:
   a step of precipitating a copper powder from an electrolytic solution on a cathode by an electrolytic method; and
   a step of coating the copper powder with silver, wherein electrolysis is conducted by using the electrolytic solution containing
   a copper ion,
   one or more kinds of compounds which have an azobenzene structure and are represented by the following Formula (2), and
   one or more kinds of nonionic surfactants:

[Chem. 2]

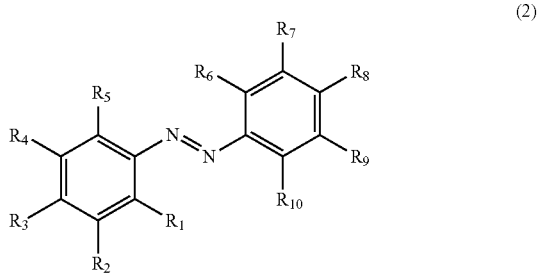

(2)

[in Formula (2), $R_1$, $R_2$, $R_3$, $R_4$, $R_5$, $R_6$, $R_7$, $R_8$, $R_9$, and $R_{10}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl].

8. A method for producing the silver-coated copper powder according to claim 2, the method comprising:
   a step of precipitating a copper powder from an electrolytic solution on a cathode by an electrolytic method; and
   a step of coating the copper powder with silver, wherein electrolysis is conducted by using the electrolytic solution containing
   a copper ion,
   one or more kinds of compounds which have a phenazine structure and an azobenzene structure and are represented by the following Formula (3), and one or more kinds of nonionic surfactants:

[Chem. 3]

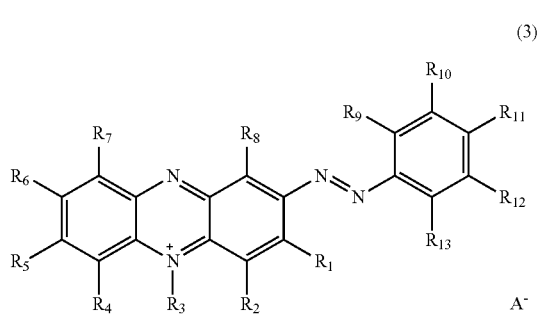

(3)

[in Formula (3), $R_1$, $R_2$, $R_4$, $R_5$, $R_6$, $R_7$, $R_8$, $R_9$, $R_{10}$, $R_{11}$, $R_{12}$, and $R_{13}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_3$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion].

9. A method for producing the silver-coated copper powder according to claim 2, the method comprising:

a step of precipitating a copper powder from an electrolytic solution on a cathode by an electrolytic method; and a step of coating the copper powder with silver, wherein electrolysis is conducted by using the electrolytic solution containing a copper ion, two or more kinds selected from the group consisting of a compound which has a phenazine structure and is represented by the following Formula (1), a compound which has an azobenzene structure and is represented by the following Formula (2), and a compound which has a phenazine structure and an azobenzene structure and is represented by the following Formula (3), and one or more kinds of nonionic surfactants:

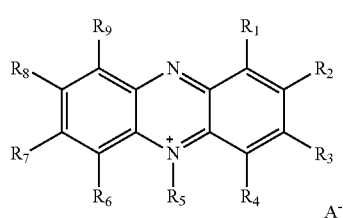

(1)

[in Formula (1), $R_1$, $R_2$, $R_3$, $R_4$, $R_6$, $R_7$, $R_8$, and $R_9$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_5$ is a group selected from the group consisting of hydrogen, a halogen, amino, OH, —O, ON, SCN, SH, COOH, a COO salt, a COO ester, $SO_3H$, a $SO_3$ salt, a $SO_3$ ester, benzenesulfonic acid, a lower alkyl, and an aryl, and A is a halide anion];

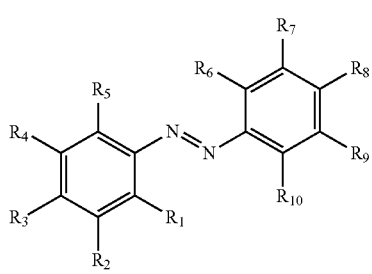

(2)

[in Formula (2), $R_1$, $R_2$, $R_3$, $R_4$, $R_5$, $R_6$, $R_7$, $R_8$, $R_9$, and $R_{10}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl];

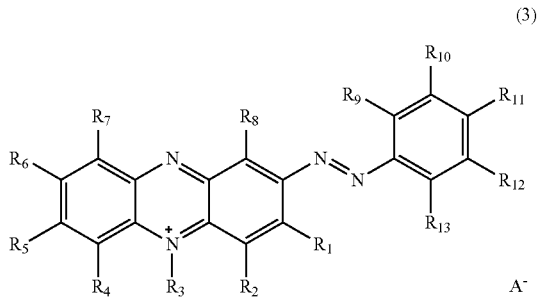

(3)

[in Formula (3), $R_1$, $R_2$, $R_4$, $R_5$, $R_6$, $R_7$, $R_8$, $R_9$, $R_{10}$, $R_{11}$, $R_{12}$, and $R_{13}$ are each independently a group selected from the group consisting of hydrogen, a halogen, amino, OH, =O, ON, SCN, SH, COOH, a COO salt, a COO ester, $SO_3H$, a $SO_3$ salt, a $SO_3$ ester, benzenesulfonic acid, and a C1 to C8 alkyl, $R_3$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and A is a halide anion].

10. The silver-coated copper powder according to claim 1, wherein a bulk density of the silver-coated copper powder is in a range of from 0.5 g/cm$^3$ to 5.0 g/cm$^3$.

11. A method for producing the silver-coated copper powder according to claim 10, the method comprising:

a step of precipitating a copper powder from an electrolytic solution on a cathode by an electrolytic method; and a step of coating the copper powder with silver, wherein electrolysis is conducted by using the electrolytic solution containing a copper ion, one or more kinds of compounds which have a phenazine structure and are represented by the following Formula (1), and one or more kinds of nonionic surfactants:

[Chem. 1]

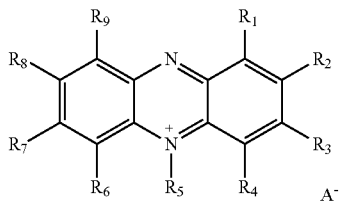

(1)

[in Formula (1), $R_1$, $R_2$, $R_3$, $R_4$, $R_6$, $R_7$, $R_8$, and $R_9$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_5$ is a group selected from the group consisting of hydrogen, a halogen, amino, OH, —O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion].

12. The silver-coated copper powder according to claim 1, wherein a BET specific surface area value of the silver-coated copper powder is from 0.2 m²/g to 5.0 m²/g.

13. A metal filler comprising the silver-coated copper powder according to claim 1 at a proportion of 20% by mass or more of the entire metal filler.

14. An electrically conductive paste comprising the metal filler according to claim 13 mixed with a resin.

15. An electrically conductive coating material for electromagnetic wave shielding comprising the metal filler according to claim 13.

16. An electrically conductive sheet for electromagnetic wave shielding comprising the metal filler according to claim 13.

17. A method for producing the silver-coated copper powder according to claim 1, the method comprising:

a step of precipitating a copper powder from an electrolytic solution on a cathode by an electrolytic method; and a step of coating the copper powder with silver, wherein electrolysis is conducted by using the electrolytic solution containing a copper ion, one or more kinds of compounds which have a phenazine structure and are represented by the following Formula (1), and one or more kinds of nonionic surfactants:

[Chem. 1]

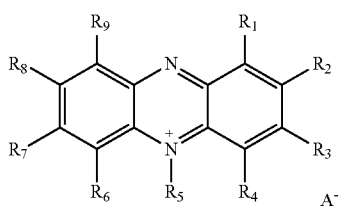

(1)

[in Formula (1), $R_1$, $R_2$, $R_3$, $R_4$, $R_6$, $R_7$, $R_8$, and $R_9$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_5$ is a group selected from the group consisting of hydrogen, a halogen, amino, OH, —O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion].

18. A method for producing the silver-coated copper powder according to claim 1, the method comprising:

a step of precipitating a copper powder from an electrolytic solution on a cathode by an electrolytic method; and a step of coating the copper powder with silver, wherein electrolysis is conducted by using the electrolytic solution containing a copper ion, one or more kinds of compounds which have an azobenzene structure and are represented by the following Formula (2), and one or more kinds of nonionic surfactants:

[Chem. 2]

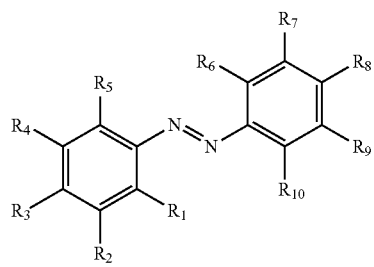

(2)

[in Formula (2), $R_1$, $R_2$, $R_3$, $R_4$, $R_5$, $R_6$, $R_2$, $R_8$, $R_9$, and $R_{10}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl].

19. A method for producing the silver-coated copper powder according to claim 1, the method comprising:

a step of precipitating a copper powder from an electrolytic solution on a cathode by an electrolytic method; and a step of coating the copper powder with silver, wherein electrolysis is conducted by using the electrolytic solution containing a copper ion, one or more kinds of compounds which have a phenazine structure and an azobenzene structure and are represented by the following Formula (3), and one or more kinds of nonionic surfactants:

[Chem. 3]

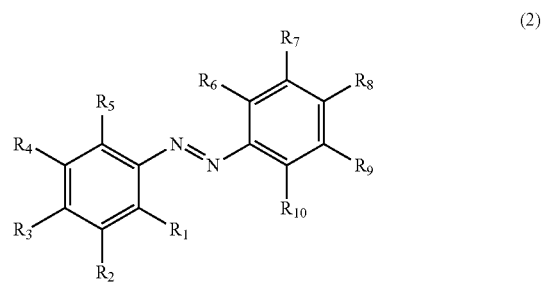

(3)

[in Formula (3), $R_1$, $R_2$, $R_4$, $R_5$, $R_6$, $R_7$, $R_8$, $R_9$, $R_{10}$, $R_{11}$, $R_{12}$, and $R_{13}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_3$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion].

20. A method for producing the silver-coated copper powder according to claim 1, the method comprising:
   a step of precipitating a copper powder from an electrolytic solution on a cathode by an electrolytic method; and
   a step of coating the copper powder with silver, wherein electrolysis is conducted by using the electrolytic solution containing a copper ion, two or more kinds selected from the group consisting of a compound which has a phenazine structure and is represented by the following Formula (1), a compound which has an azobenzene structure and is represented by the following Formula (2), and a compound which has a phenazine structure and an azobenzene structure and is represented by the following Formula (3), and one or more kinds of nonionic surfactants:

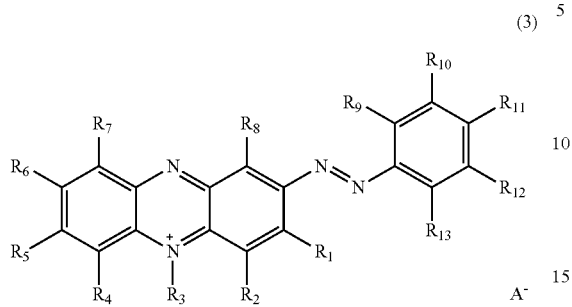

(1)

[in Formula (1), $R_1$, $R_2$, $R_3$, $R_4$, $R_6$, $R_7$, $R_8$, and $R_9$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_5$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and A is a halide anion];

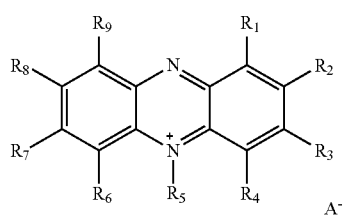

(2)

[in Formula (2), $R_1$, $R_2$, $R_3$, $R_4$, $R_5$, $R_6$, $R_7$, $R_8$, $R_9$, and $R_{10}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl];

[Chem. 6]

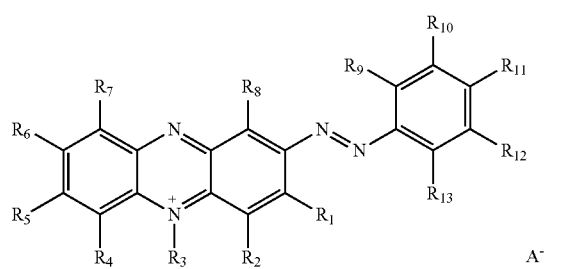

(3)

[in Formula (3), $R_1$, $R_2$, $R_4$, $R_5$, $R_6$, $R_7$, $R_8$, $R_9$, $R_{10}$, $R_{11}$, $R_{12}$, and $R_{13}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_3$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and A is a halide anion].

\* \* \* \* \*